US012473793B2

(12) United States Patent
Boyd et al.

(10) Patent No.: US 12,473,793 B2
(45) Date of Patent: Nov. 18, 2025

(54) WELLHEAD FLOW BLOCK AND FLOW CONTROL MECHANISMS

(71) Applicant: FLOWCO PRODUCTION SOLUTIONS, LLC, Spring, TX (US)

(72) Inventors: Mitchell A. Boyd, Haslet, TX (US); Darrell Mitchum, Oakhurst, TX (US); Garrett S. Boyd, Granbury, TX (US)

(73) Assignee: Flowco MasterCo LLC, Houston, TX (US)

( * ) Notice: Subject to any disclaimer, the term of this patent is extended or adjusted under 35 U.S.C. 154(b) by 0 days.

(21) Appl. No.: 18/918,532

(22) Filed: Oct. 17, 2024

(65) Prior Publication Data

US 2025/0137342 A1 May 1, 2025

Related U.S. Application Data

(63) Continuation of application No. 18/797,839, filed on Aug. 8, 2024, which is a continuation of application No. 18/497,590, filed on Oct. 30, 2023, now Pat. No. 12,098,609.

(51) Int. Cl.
E21B 33/068 (2006.01)
E21B 4/00 (2006.01)
E21B 23/12 (2006.01)
E21B 43/12 (2006.01)

(52) U.S. Cl.
CPC .................. *E21B 33/068* (2013.01)

(58) Field of Classification Search
CPC ........ E21B 34/025; E21B 43/12; E21B 23/12; E21B 4/00; F16N 7/14

USPC ....................................................... 166/90.1
See application file for complete search history.

(56) References Cited

U.S. PATENT DOCUMENTS

| | | |
|---|---|---|
| 3,095,819 A | 7/1963 | Brown |
| 3,351,021 A | 11/1967 | Moore, Jr. |
| 4,613,140 A | 9/1986 | Knox |
| 5,832,956 A | 11/1998 | Nimberger |
| 5,957,200 A | 9/1999 | Majek |
| 7,331,393 B1 | 2/2008 | Hoel |
| 9,587,444 B2 | 3/2017 | Agarwal |

(Continued)

OTHER PUBLICATIONS

International Search Report and Written Opinion issued in App. No. PCT/US2024/046699, dated Nov. 14, 2024, 8 pages.

(Continued)

*Primary Examiner* — Nicole Coy
*Assistant Examiner* — Douglas S Wood
(74) *Attorney, Agent, or Firm* — Jason P. Mueller; FisherBroyles, LLP

(57) ABSTRACT

A unitary wellhead flow block lubricator assembly includes a unitary body and flow passageways that extend through the unitary body. Various openings on the exterior of the unitary body allow flow control devices to be mounted in the flow passageways to control the flow of fluid though the flow passageways. One or more of the control devices could be mountable in two or more orientations that alter the way in which the flow control device controls flow through one or more passageways in the unitary body. One or more choke mechanisms may also be mounted on the unitary body. The choke mechanisms may allow an operator to selectively adjust a flow of fluid through one or more of the passageways in the unitary body.

21 Claims, 14 Drawing Sheets

(56) References Cited

U.S. PATENT DOCUMENTS

| | | |
|---|---|---|
| 9,850,731 B2 | 12/2017 | Maerz |
| 11,761,286 B2 | 9/2023 | Robinson |
| 12,065,903 B1* | 8/2024 | Boyd .................... E21B 34/025 |
| 12,098,609 B1 | 9/2024 | Boyd |
| 2006/0108126 A1 | 5/2006 | Horn |
| 2010/0294507 A1 | 11/2010 | Tanton |
| 2014/0020909 A1* | 1/2014 | McKeon ................. F16K 31/50 |
| | | 166/91.1 |
| 2015/0316169 A1* | 11/2015 | Bohaychuk ............. E21B 34/02 |
| | | 251/58 |
| 2016/0123109 A1* | 5/2016 | Hoang .................... E21B 34/02 |
| | | 251/355 |
| 2016/0223089 A1* | 8/2016 | Nijland ................. F16K 27/045 |
| 2016/0265288 A1 | 9/2016 | Kenworthy |
| 2016/0341195 A1 | 11/2016 | Roycroft |
| 2017/0044882 A1 | 2/2017 | Casey et al. |
| 2017/0342792 A1 | 11/2017 | Mchugh |
| 2019/0234191 A1* | 8/2019 | Murdoch ................. E21B 43/12 |
| 2019/0324191 A1 | 10/2019 | Crompvoets |
| 2021/0054839 A1* | 2/2021 | Kegin ..................... F16N 7/385 |
| 2021/0071505 A1 | 3/2021 | Boyd |
| 2022/0018206 A1* | 1/2022 | Perschke ............... E21B 19/086 |
| 2022/0290499 A1* | 9/2022 | Geldenhuys ............. F16N 7/14 |
| 2022/0349280 A1* | 11/2022 | Brewer ................... F04B 47/12 |
| 2023/0175350 A1 | 6/2023 | Freeman |
| 2023/0185350 A1 | 6/2023 | Koerner |
| 2023/0287769 A1* | 9/2023 | Roycroft ............... E21B 43/129 |
| 2023/0387769 A1 | 11/2023 | Myung |
| 2024/0052728 A1 | 2/2024 | Zahran |
| 2024/0102351 A1* | 3/2024 | Freeman ............... E21B 33/068 |

OTHER PUBLICATIONS

Office Action (Notice of Allowance and Fees Due (PTOL-85)) dated Jul. 17, 2025 for U.S. Appl. No. 18/797,839 (pp. 1-8).

Office Action (Non-Final Rejection) dated Jun. 23, 2025 for U.S. Appl. No. 18/918,584 (pp. 1-12).

Office Action (Final Rejection) dated Aug. 20, 2025 for U.S. Appl. No. 18/918,584 (pp. 1-9).

\* cited by examiner

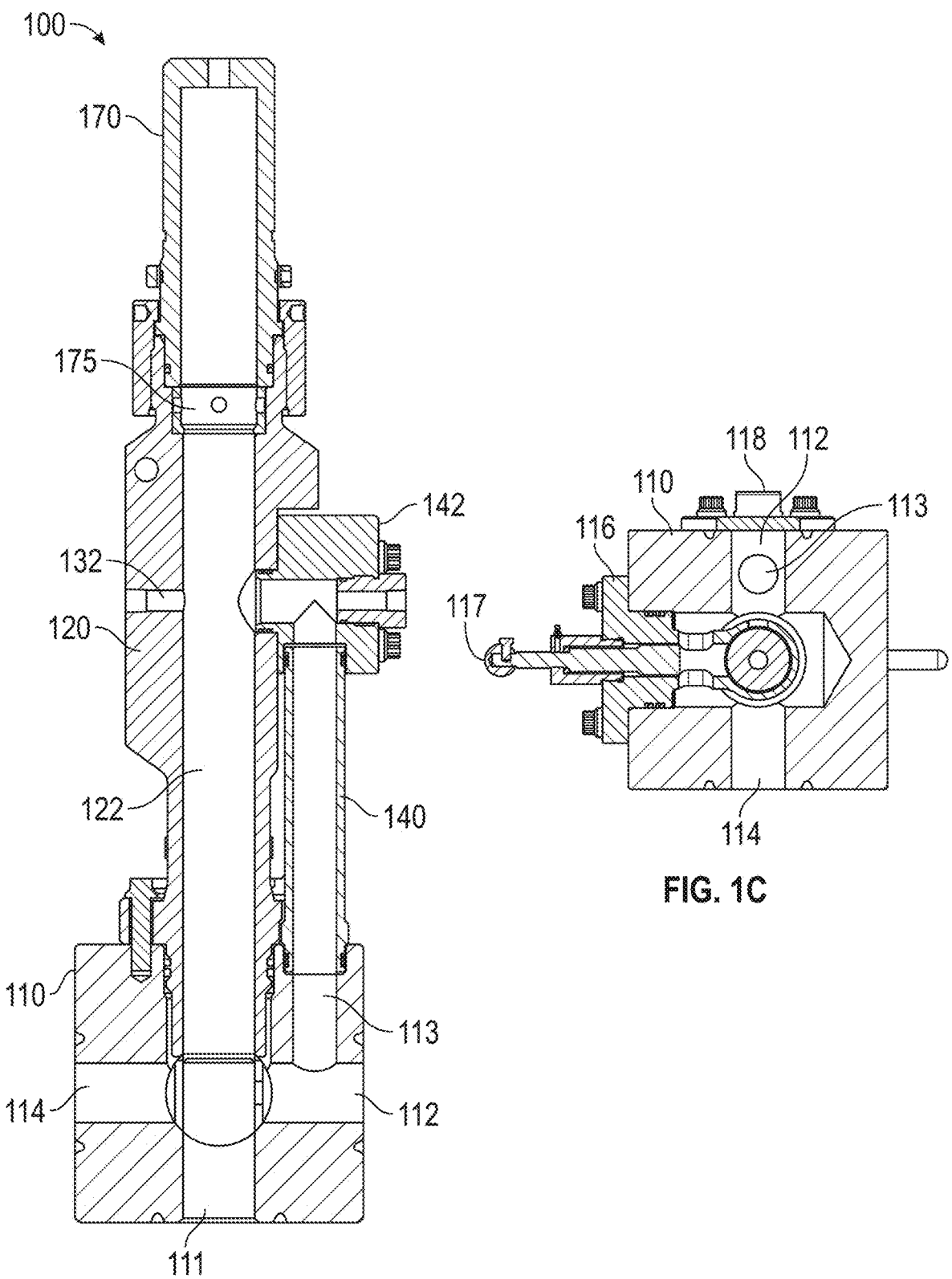

WELLHEAD FLOW BLOCK AND FLOW CONTROL MECHANISMS

This application is a continuation of U.S. application Ser. No. 18/797,839, filed Aug. 8, 2024, which is itself a continuation of U.S. application Ser. No. 18/497,590, filed Oct. 30, 2023, now U.S. Pat. No. 12,098,609, issued Sep. 24, 2024, the contents of both of which are incorporated herein by reference.

BACKGROUND OF THE INVENTION

The present disclosure relates to an integrated wellhead flow block lubricator assembly that is configured to function as both a flow block or manifold for natural flowing wells as well as a flow block lubricator assembly for wells using a plunger to enhance production. The integrated wellhead flow block lubricator assembly would be mounted on an outflow pipe of a well.

When a plunger is used in a well to enhance production, the natural gas energy propelling the plunger to the surface and the appropriate differential pressure across the plunger is essential for successful plunger cycles to lift liquids to the surface. A plunger catcher mechanism is often integrated in the body of the lubricator. The plunger catcher mechanism is configured to hold and release a plunger.

A plunger lift lubricator can be assembled with various internal configurations depending on the type of plunger utilized in the tubing string. Traditional lubricators have two outlets, an upper outlet and a lower outlet. Control over the flow of gas and fluids through the lubricator makes it possible to control the landing position of the plunger in the lubricator. The lower outlet typically has a ball valve or choke mechanism to allow the operator to adjust or restrict the flow of liquid out of the lower outlet, thereby forcing more flow to the upper outlet. This creates less restriction or less back pressure at the upper outlet, which forces the plunger to travel upward towards the upper outlet. The plunger can then be captured in the lubricator and released at intervals controlled by a surface controller. The surface controller can be programmed by the user based on the flow of gas or liquid to optimize well performance.

The plunger catcher mechanism may include a mechanism that is designed to reset a flow valve or a ball valve within the plunger such that the plunger can descend back into the wellbore. In such cases, failure to drive the plunger fully into the plunger catcher mechanism may result in the flow valve or ball valve not being reset, which would likely prevent the plunger from descending back into the wellbore.

BRIEF DESCRIPTION OF THE DRAWINGS

The accompanying drawings are part of the present disclosure and are incorporated into the specification. The drawings illustrate examples of embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein.

FIG. 1B is a longitudinal cross-sectional view of the flow block and lubricator assembly illustrated in FIG. 1A.

FIG. 1C is a cross-sectional view of the flow block illustrated in FIG. 1A taken through a portion of the flow block that houses the choke mechanism.

DETAILED DESCRIPTION OF THE INVENTION

The present application discloses various devices used in connection with wells that produce fluids and gases, such as oil and natural gas. For the sake of simplicity and brevity, the following description will refer to flows of "fluid" However, references to a flow of "fluid" are intended to encompass and include flows of fluids, gases and mixtures of fluids and gases.

The present disclosure is concerned with a wellhead flow block lubricator assembly that is used to control the outflow of fluid from a well. The wellhead flow block lubricator can be integrated with a plunger catcher mechanism that is configured to hold and release a plunger used in oil and gas wells.

Figure 1A:
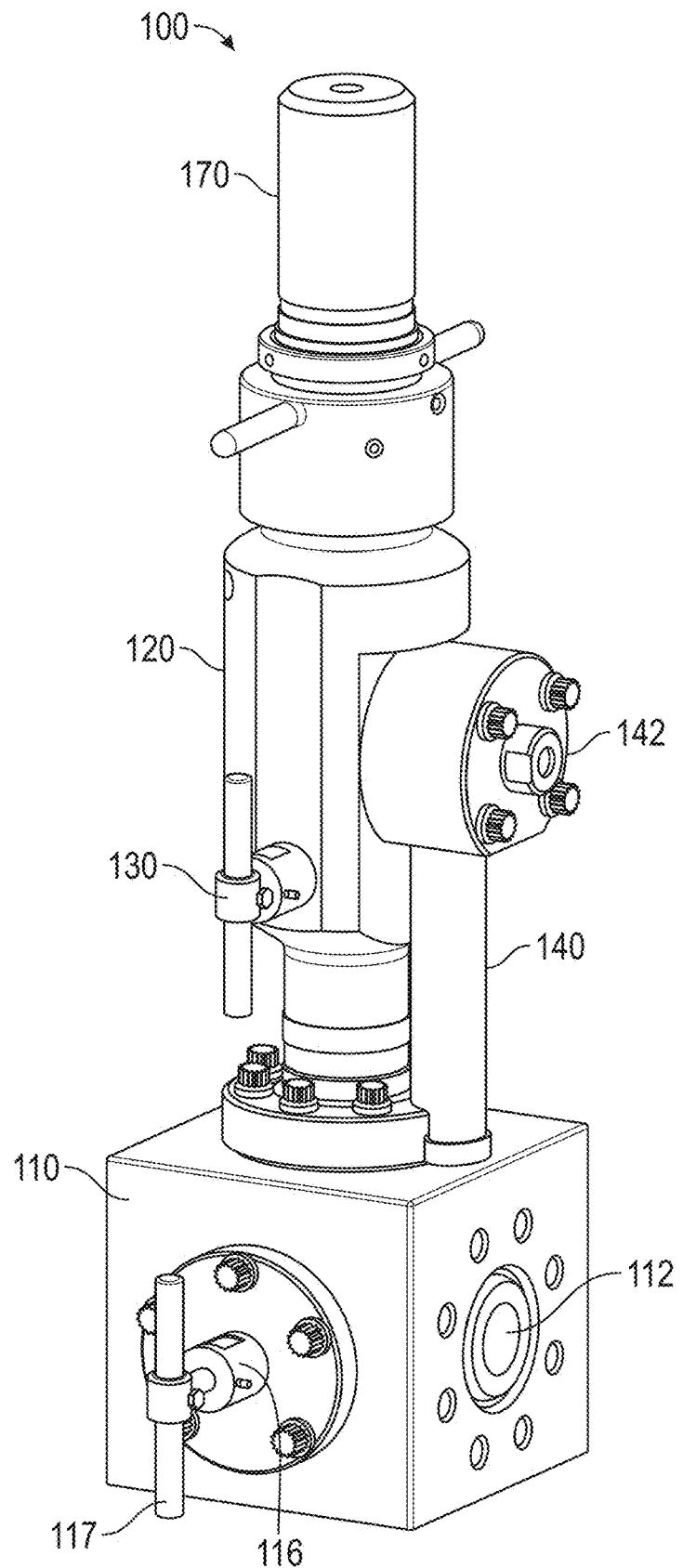
FIG. 1A is a perspective view of a first embodiment of a flow block and lubricator assembly with a plunger catcher assembly, a manually operated choke mechanism and a single return flow passageway.

A first embodiment of a wellhead flow block and lubricator assembly is illustrated in FIGS. 1A-1C. As shown therein, a flow block 110 is mounted to the master valve and outflow pipe of a well, and an upper subassembly 120 is then mounted on top of the flow block 110. Oil or gas produced by the well is routed through the flow block 110 to a production line that typically leads to a production separator. The liquids are then collected in production tanks.

When the downhole pressure of an oil or gas well is no longer high enough to generate a sufficiently high natural flow rate, one can employ a plunger to help bring the liquids and gases to the surface. A plunger is a device that is configured to freely descend and ascend within a well bore. Some embodiments are configured as a "bypass" plunger, which may include a self-contained valve—also called a "dart" or a "dart valve"—to control the descent and ascent. Typically the valve in a bypass plunger is opened to permit fluids and gas in the well to flow through the valve and one or more internal passageways in the plunger body as the plunger descends through the well.

Upon reaching the bottom of the well, the valve or dart is closed, sealing off the internal passageway(s) within the plunger. The exterior of the plunger seals against the wall of the wellbore. With the valve or dart closed, pressure builds below the plunger until the pressure is sufficient to lift the plunger and the column of fluid in the wellbore above the plunger to the surface. As fluid above the bypass plunger arrives at the surface, the fluid is routed by the flow block 110 to a production line. While the above description applies to bypass plungers, other types of plungers can also be used to help restore production to an oil or gas well.

When a plunger arrives at the surface, it passes through the flow block 110 and into the upper subassembly 120 mounted on top of the flow block 110. A plunger catcher or holding mechanism 130 in the upper subassembly 120 can hold the plunger once the plunger arrives at a receiving location. The plunger catcher or holding mechanism 130 can also be operated to release the plunger so that it can descend back to the bottom of the wellbore.

As illustrated in FIG. 1B, the inlet passageway 111 of the flow block 110 would be attached to the outflow pipe of the well. The inlet passageway 111 is aligned with a main passageway 122 of the upper subassembly 120. While a plunger is ascending the wellbore, pushing a column of fluid upward, the fluid can be routed out of a first outflow passageway 112 and/or a second outflow passageway 114 of the flow block 110. However, fluid exiting the well can also travel up through the main passageway 122 in the upper subassembly 120. Fluid and gas passing up the main passageway 122 is routed into a return manifold 142 and then into a return passageway 140. The fluid in the return passageway 140 is delivered into a return inlet 113 on the top of the flow block 110, which delivers the fluid back into the first and/or second outflow passageways 112/114.

The routing of fluid into the main passageway 122 of the upper subassembly 120 and then through the return manifold 142 and return passageway 140 ensures that a flow of fluid/gas will carry the plunger fully up into the upper subassembly 120 when it arrives at the surface.

If the flow of fluid out of the well is not strong, it may be necessary to partially choke off the flow of fluid moving from the inlet passageway 111 directly into the first and/or second outflow passageways 112, 114. In many instances, only one outflow passageway is connected to a production line. In other instances, both the first and second outflow passageways 112, 114 are connected to a production line. In any event, it may be necessary to choke off the flow of fluid through one or both of the outflow passageways 112, 114 so that a greater amount of fluid flows up into the unrestricted main passageway 122, upper flow manifold 142 and return passageway 140. This ensures that when the plunger arrives at the surface, the flow of fluid into the main passageway 122 of the upper subassembly 120 is strong enough to carry the plunger fully up into the receiving position in the upper subassembly 120.

FIGS. 1A-1C illustrate a choke mechanism 116/117 that can be used for this purpose. While the choke mechanism 116/117 will reduce the amount of fluid passing directly from the inlet passageway 111 into the first and/or second outflow passageways 112/114, the return passageway 140 ensures that the flow of fluid into the main passageway 122 of the upper subassembly 120 flows easily and freely out of the flow block 110.

Figure 2A:
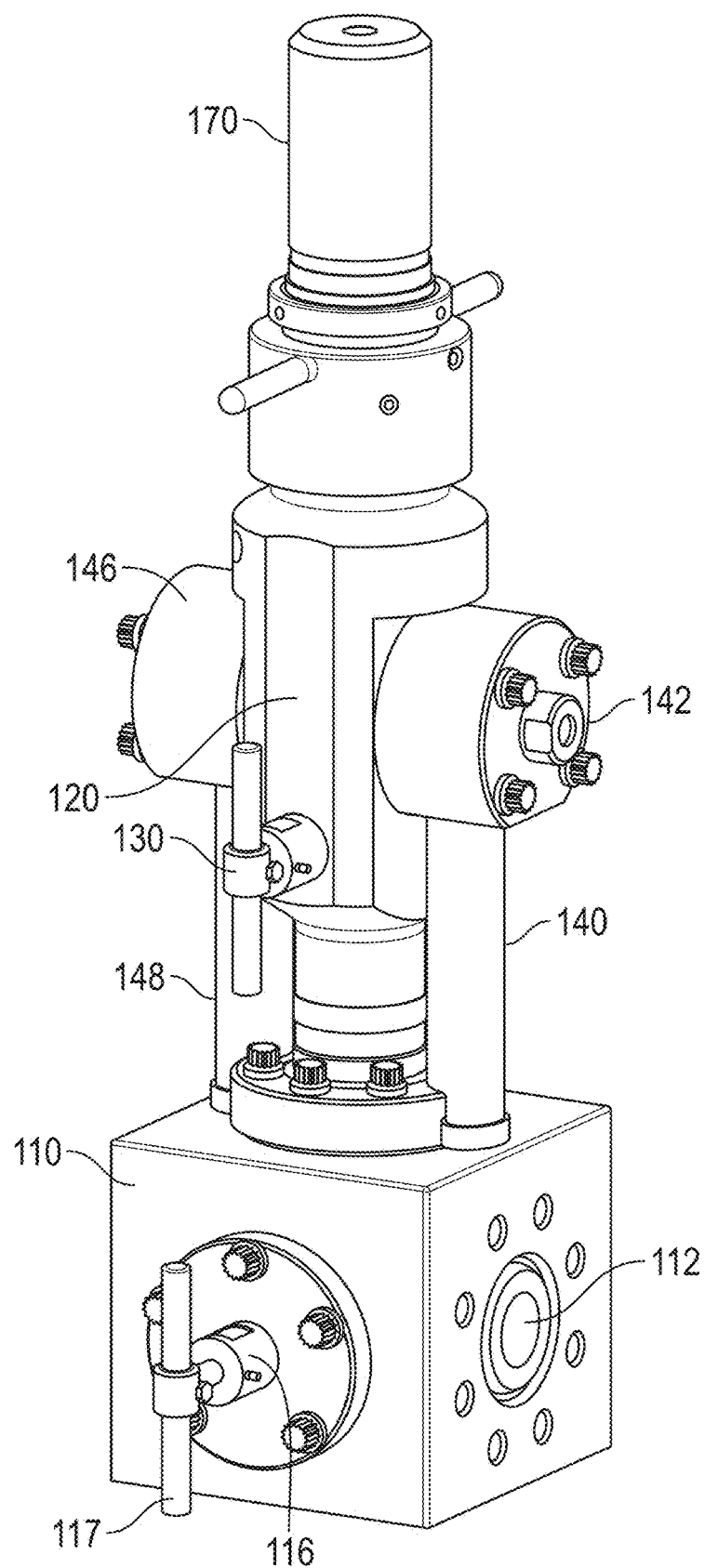
FIG. 2A is a perspective view of a second embodiment of a flow block and lubricator assembly with a plunger catcher assembly, a manually operated choke mechanism and two return flow passageways.
Figures 2B, 2C:
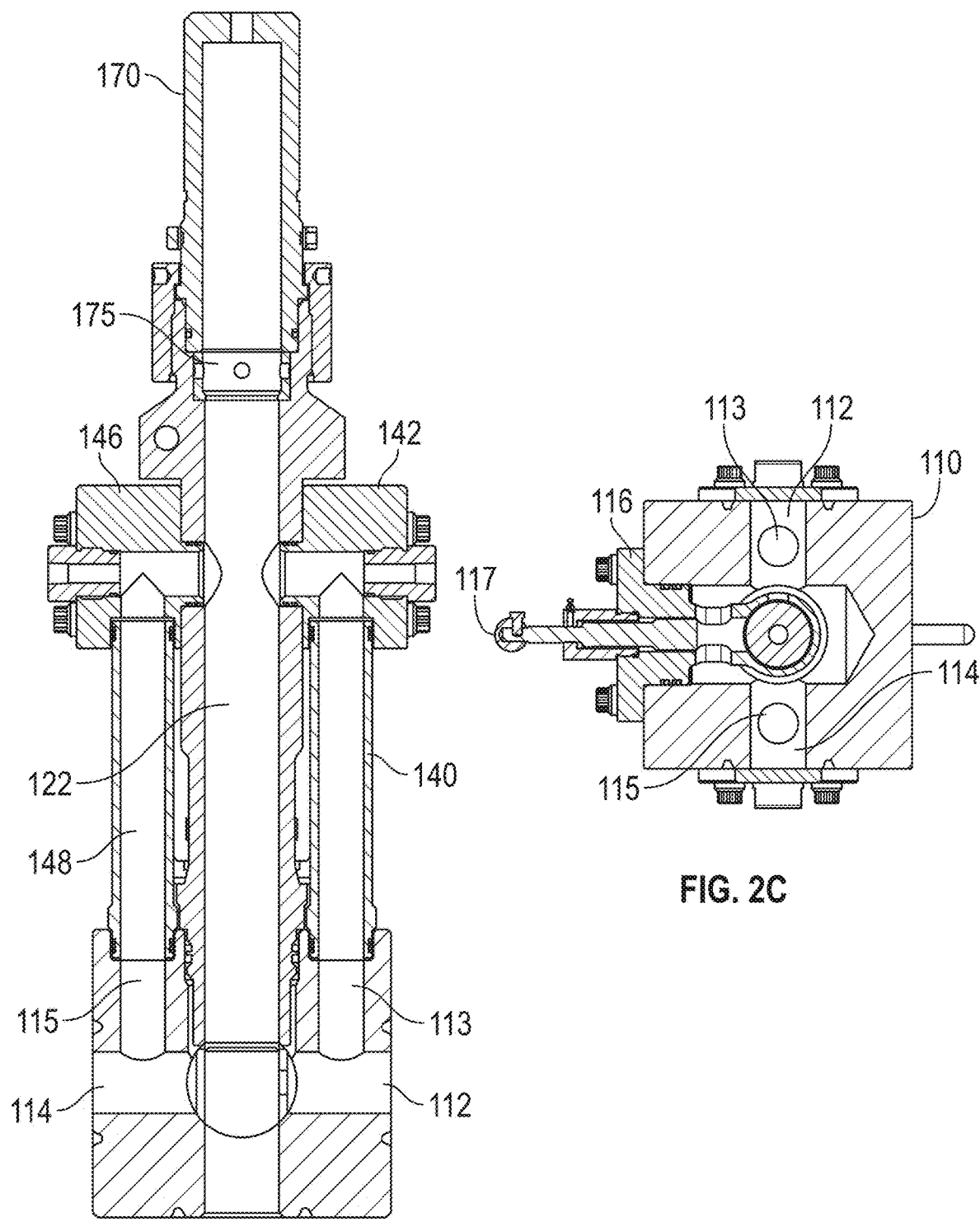
FIG. 2B is a longitudinal cross-sectional view of the flow block and lubricator assembly illustrated in FIG. 2A.
FIG. 2C is a cross-sectional view of the flow block illustrated in FIG. 2A taken through a portion of the flow block that houses the choke mechanism.

On wells that do not have a high flow rate, the embodiment illustrated in FIGS. 1A-1C having only a single return passageway 140 may be sufficient to handle the flow of fluid and gas produced by the well. However, if a well has a high flow rate, an embodiment as illustrated in FIGS. 2A-2C having first and second return passageways 140, 148 may be more appropriate. The addition of the second return passageway 148 helps to handle the flow in high flow rate wells.

When the flow rate of fluid out of the well is quite light, it may be desirable to choke the outflow of fluid through one or both of the return lines 140, 148 to cause more backpressure in the main passageway 122. The greater backpressure in the main passageway would serve to ensure that the plunger impact is controlled, thus protecting the plunger from premature failure, and also to ensure the plunger fully ascends up the main passageway 122 into the receiving position within the upper subassembly 120. As will be explained in greater detail below, one or more flow restrictors could be mounted in the return manifolds 142, 146 to restrict the flow of fluid into the first and second return passageways 140, 148.

FIGS. 3A-3D and 4A-4E illustrate two embodiments of a unitary wellhead flow block lubricator assembly that includes an integrated plunger catcher. These designs make very efficient use of the space located directly over the wellhead. In these embodiments, the main passageway and the return passageways are internal passageways that pass though the interior of a unitary body. In addition to first and second return passageways, as provided in the embodiment illustrated in FIGS. 2A-2C, embodiments as illustrated in FIGS. 3A-4E can include a third return passageway, which also would be an internal passageway. The unitary body of these designs is configured such that flow restrictors can be mounted to the unitary body to selectively control the flow of fluids through the internal passageways.

Both embodiments of the unitary wellhead flow block lubricator assembly include a unitary body 200/300 having a front 201, a first side 202, a rear 203 and a second side 204. As depicted in FIGS. 3C, 3D, 4C and 4D, an inlet passageway 222 opens to the bottom of the unitary body 200/300. The inlet passageway 222 would be connected to a master valve above the wellhead.

An integrated choke mechanism 500, which is described in more detail below, is mounted in a choke passageway 216. The choke passageway 216 leads to a first opening on the front 201 of the unitary body 200/300. A flange 502 of the integrated choke mechanism 500 is mounted over the first opening.

The inlet passageway 222 also leads to a lower distribution block that includes a first outflow passageway 212, a second outflow passageway 214 and a rear outflow passageway 218. The first outflow passageway 212 leads to a second opening on the lower portion of the first side 202 of the unitary body 200/300. The second outflow passageway 214 leads to a third opening on the lower portion of the second side 204 of the unitary body 200/300. Further, the rear outflow passageway 218 leads to a fourth opening on the rear 203 of the unitary body 200/300.

A main passageway 220, which is aligned with the inlet passageway 222, extends up the center of the unitary body 200/300. A plunger catcher mechanism 230 is mounted on the front 201 of the unitary body 200/300. When a plunger travels up to the surface of the well, the flow of fluid exiting the well causes the plunger to travel through the inlet passageway 222 and into the main passageway 220. The plunger catcher mechanism 230 includes an element that bears against the exterior of the plunger to hold it at a receiving location within the main passageway 220. A handle 231 of the plunger catcher mechanism 230 can be operated to release the plunger so that the plunger can descend back into the wellbore.

A first return passageway 242 extends through the unitary body 200/300 adjacent to the first side 202 of the unitary body 200/300 from the upper portion of the unitary body 200/300 to the lower portion of the unitary body 200/300. The lower portion of the first return passageway 242 opens into the first outflow passageway 212.

A second return passageway 244 extends through the unitary body 200/300 adjacent to the second side 204 of the unitary body 200/300 from the upper portion of the unitary body 200/300 to the lower portion of the unitary body 200/300. The lower portion of the second return passageway 242 opens into the second outflow passageway 214.

An upper distribution block is provided at the upper portion of the unitary body 200/300. The upper distribution block includes a first upper passageway 232 that extends from the main passageway 220 to a first upper opening provided on the upper portion of the first side 202 of the unitary body 200/300. An upper portion of the first return passageway 242 opens into the first upper passageway 232. The upper distribution block also includes a second upper passageway 234 that extends from the main passageway 220 to a second upper opening provided on the upper portion of the second side 204 of the unitary body 200/300. An upper portion of the second return passageway 244 opens into the first upper passageway 232.

Figure 3B:
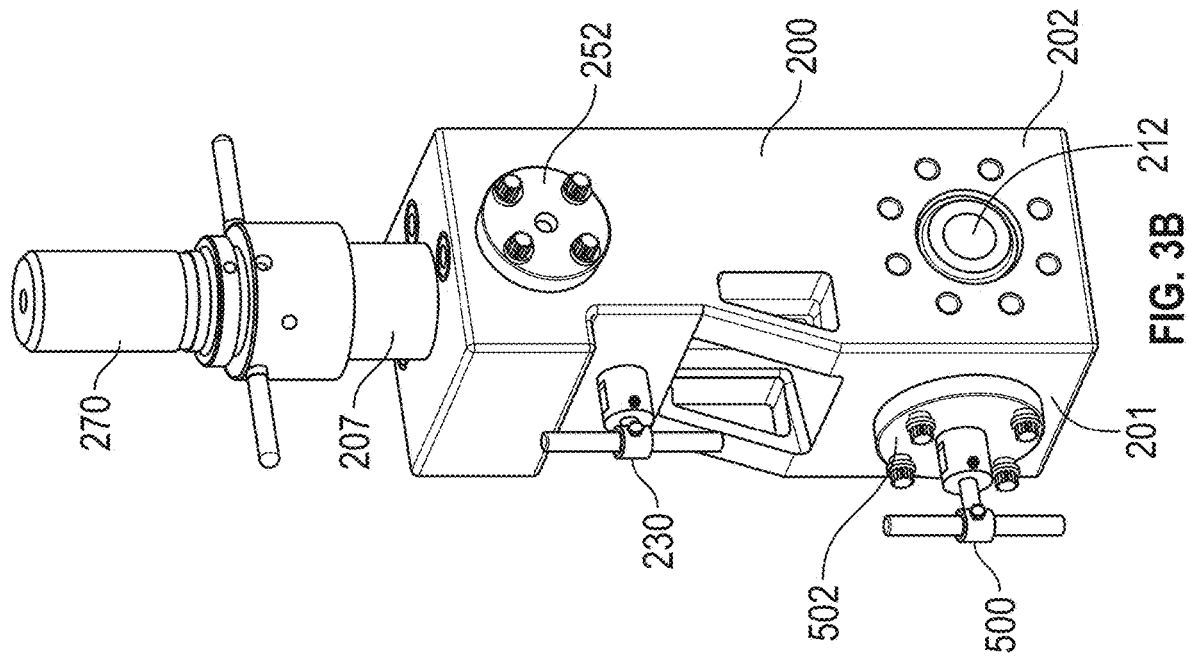
FIGS. 3A and 3B are perspective views of a first embodiment of unitary wellhead flow block lubricator assembly having internal return flow passageways.
Figure 3A:
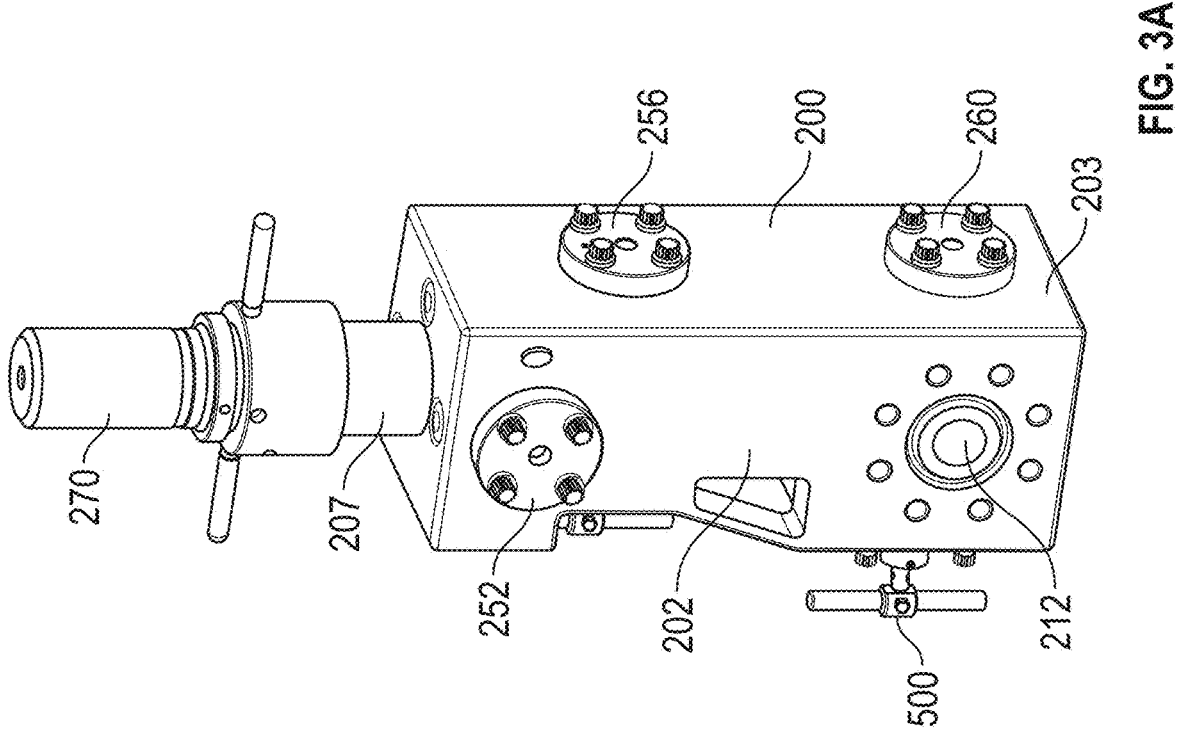
Figure 3D:
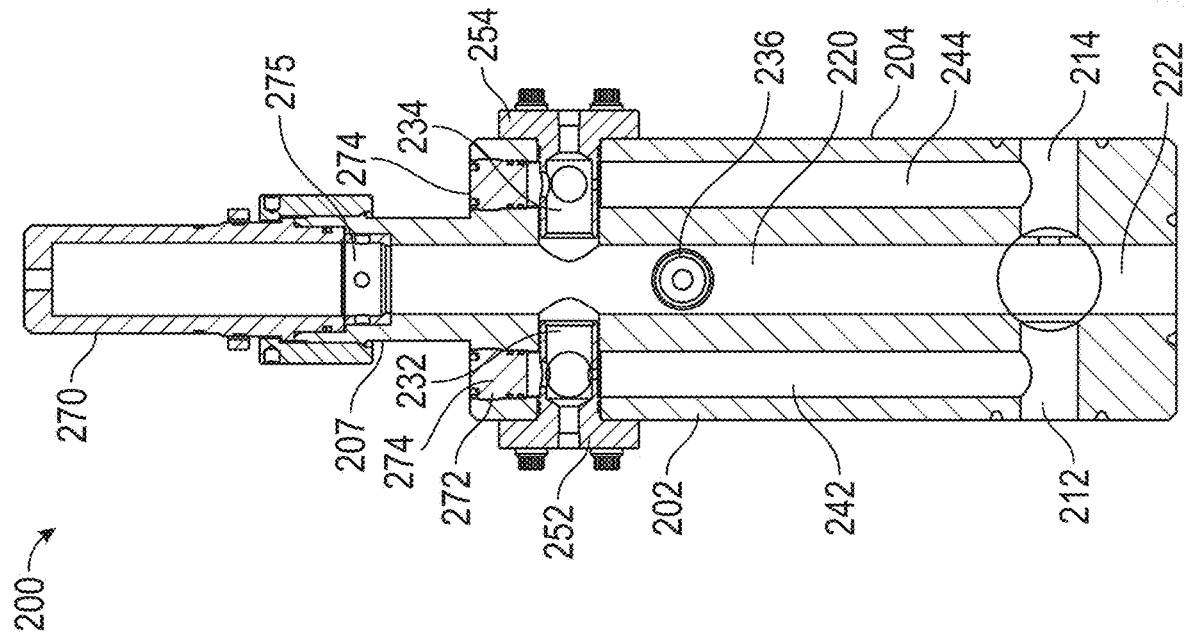
FIG. 3D is a second longitudinal cross-sectional view of the unitary wellhead flow block lubricator assembly illustrated in FIGS. 3A and 3B.
Figure 3C:
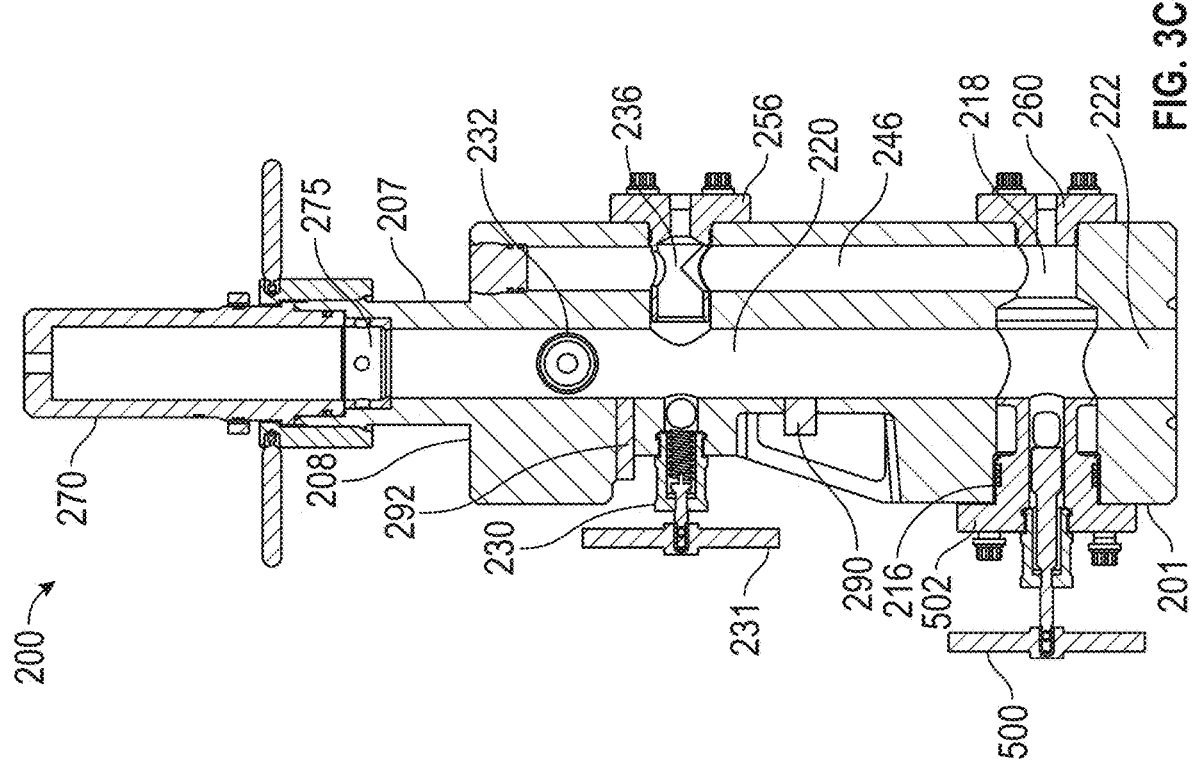
FIG. 3C is a first longitudinal cross-section view of the unitary wellhead flow block lubricator assembly illustrated in FIGS. 3A and 3B.
Figure 4B:
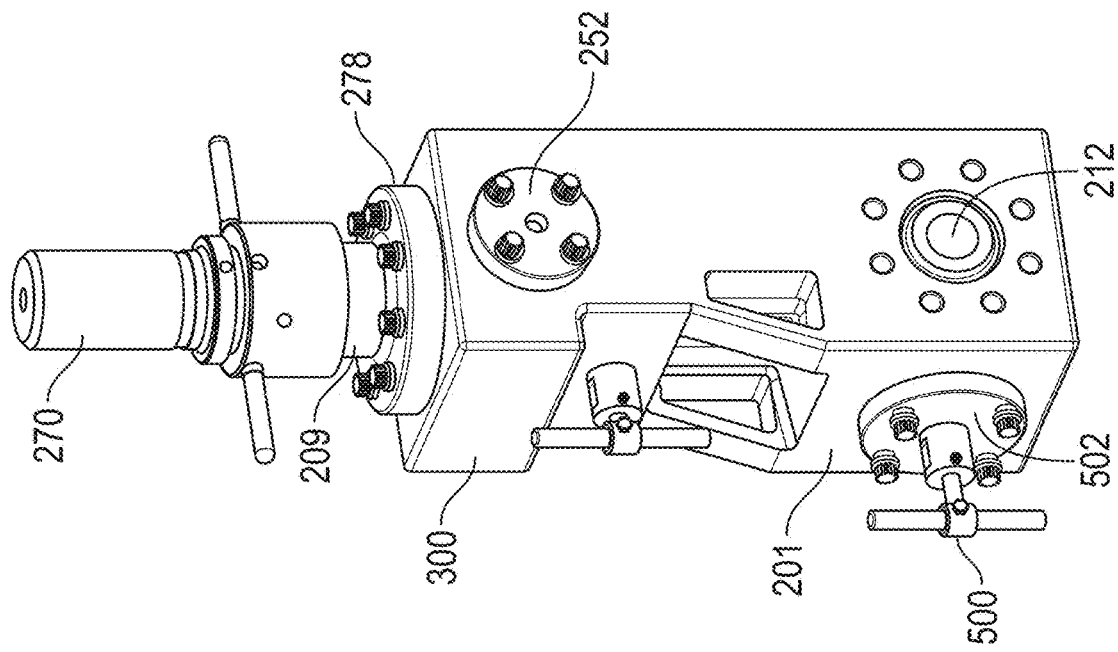
FIGS. 4A and 4B are perspective views of a second embodiment of unitary wellhead flow block lubricator assembly having internal return flow passageways.
Figure 4A:
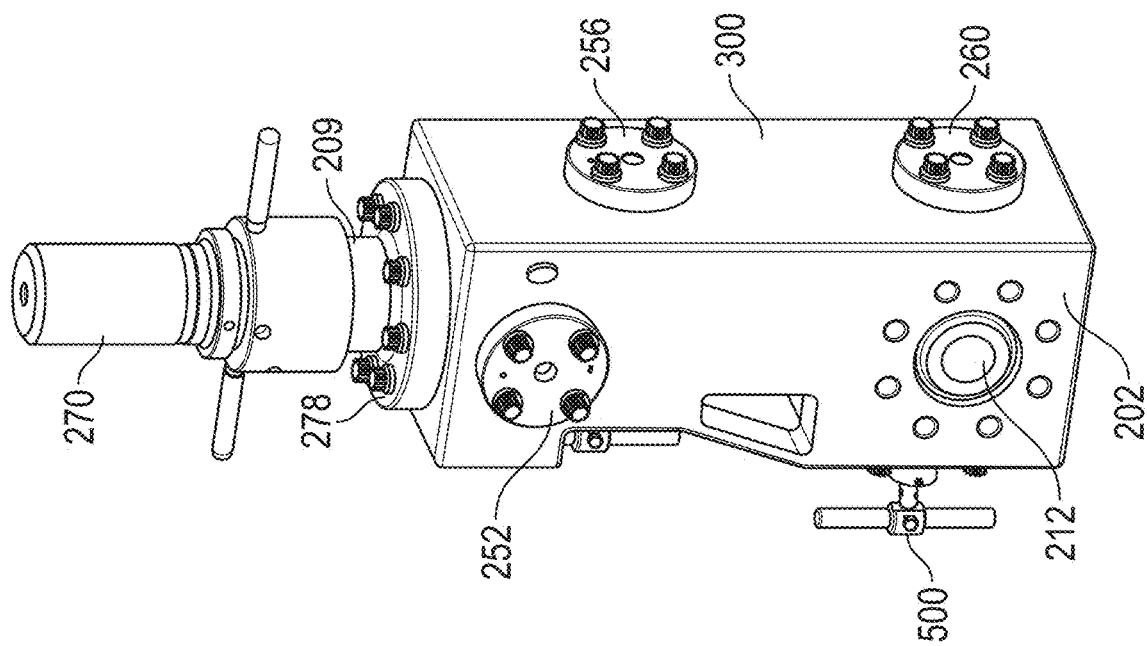
Figure 4D:
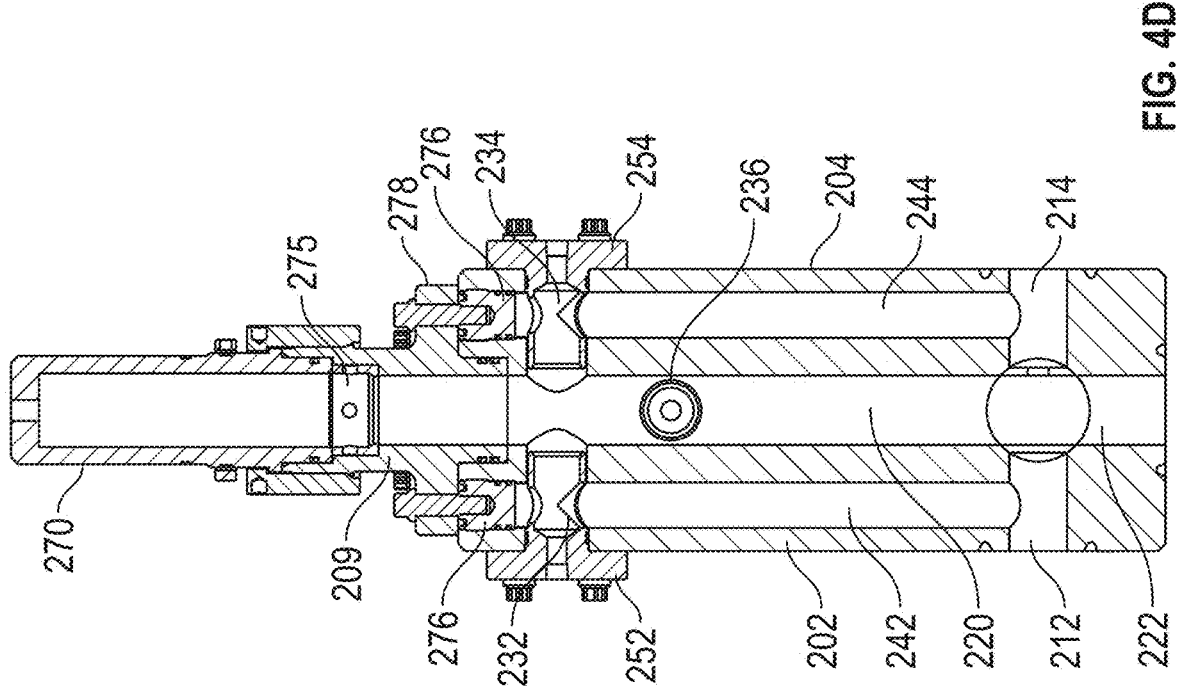
FIG. 4D is a second longitudinal cross-sectional view of the unitary wellhead flow block lubricator assembly illustrated in FIGS. 4A and 4B.
Figure 4C:
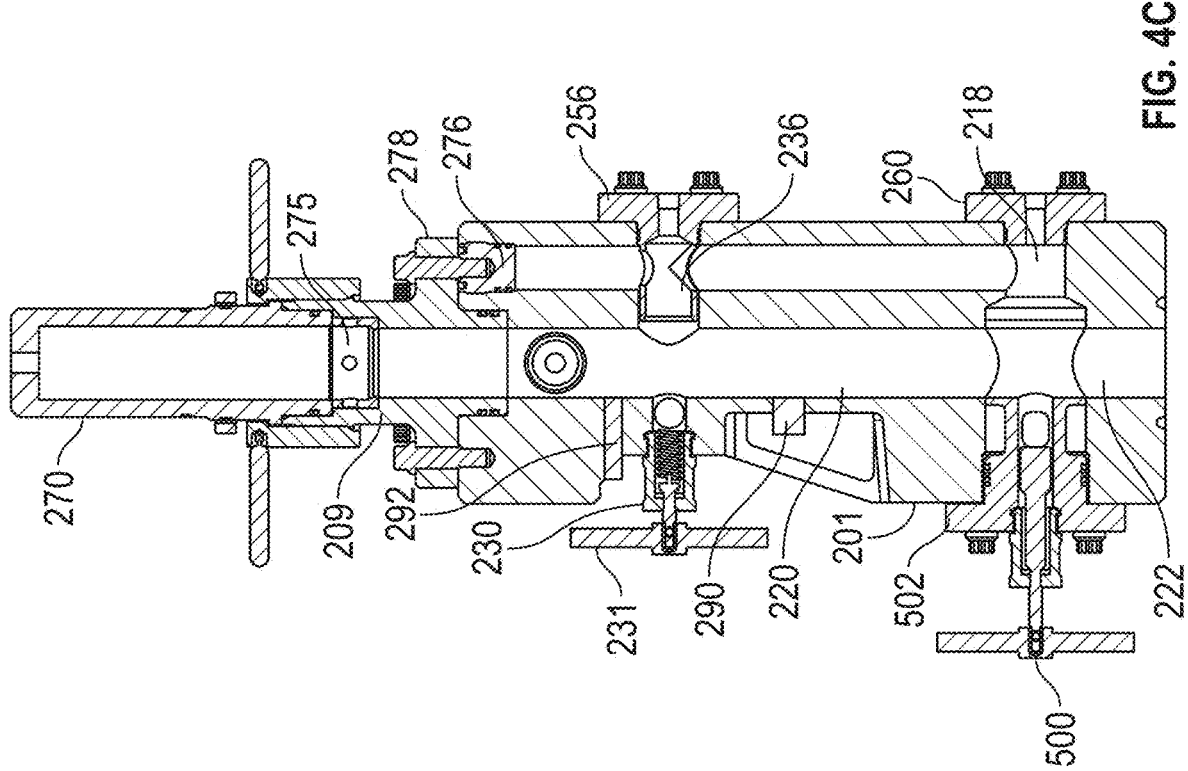
FIG. 4C is a first longitudinal cross-section view of the unitary wellhead flow block lubricator assembly illustrated in FIGS. 4A and 4B.

As depicted in FIGS. 3C and 4C, a third return passageway 246 extends through the unitary body adjacent the rear 203 of the unitary body 200/300 from a position partway up the unitary body to a position that opens into the rear outflow passageway 218. A third upper passageway 236 extends from the main passageway 220 to a third upper opening provided at a midpoint of the rear 203 of the unitary body 200/300. An upper portion of the third return passageway 246 opens into the third upper passageway 236. Note, the location of the third upper passageway 236 is lower than the position of the first upper passageway 232 and the second upper passageway 234. This can be significant when setting the flow of fluids through the internal passageways of the unitary body 200/300.

The third return passageway 246 provides additional flow output from the main passageway 220 back into the first and second outflow passageways 212/214. The provision of the third upper passageway 236 and the third return passageway 246 can be used to dampen the impact that can occur when the plunger surfaces by allowing the fluid/gas to exit the main passageway 220 from a location that is lower in the unitary body 200/300 than where fluid/gas exits the man passageway 220 via the first and second upper passageways 232/234.

FIGS. 3C and 4C also illustrate that a plunger arrival sensor 290 may be mounted on the front 201 of the unitary body 200/300 at a position below the plunger catcher assembly 230. The plunger arrival sensor 290 is mounted in a sensor hole or sensor passageway that extends from the front 201 of the unitary body 200/300 into the main passageway 220. The plunger arrival sensor 290 detects when a plunger arrives within the unitary body 200/300. In some embodiments, the plunger arrival sensor 290 could be connected to a control system that controls, among other things, when the plunger is released back down into the wellbore.

FIGS. 3C and 4C also illustrate that a plunger seated sensor 292 may be mounted on the front 201 of the unitary body 200/300 at a position above the plunger catcher assembly 230. The plunger seated sensor 292 is configured to detect when a plunger has traveled all the way into the proper receiving position within the unitary body 200/300.

As is well known to those of skill in the art, it may be necessary for the plunger to travel all the way up into a receiving position within the lubricator so that an element within the lubricator can reset a valve arrangement in or on the plunger that allows the plunger to descend back into the wellbore. If the plunger does not arrive at the proper receiving position, the valve arrangement may not be reset and it may be impossible for the plunger to descend back into the wellbore. For these reasons, in some embodiments, the plunger seated sensor 292 could be connected to a control system that controls, among other things, when the plunger is released back down into the wellbore.

The plunger arrival sensor 290 and the plunger seated sensor 292 could make use of a variety of different sensing technologies to detect when a plunger arrives within the main passageway 220 of the unitary body 200/300 and whether or when the plunger is fully seated at the receiving position within the lubricator. The sensing technologies could include magnetic or metallic sensors, various optical sensors, as well as mechanical sensors or switches. In some embodiments, the plunger arrival sensor 290 and the plunger seated sensor 292 could utilize the same type of sensing technology and even be the same type of sensor. In other embodiments, the plunger arrival sensor 290 may use a first type of sensing technology and the plunger seated sensor 292 may use a second, different type of sensing technology.

Although FIGS. 3C and 4C illustrate the plunger arrival sensor 290 and the plunger seated sensor 292 mounted in sensor holes that extends into the main passageway 220, in alternate embodiments it may not be necessary for the sensor holes for one or both of the sensors to extend all the way into the main passageway 220. For example, if the plunger arrival sensor 290 and/or the plunger seated sensor 292 make use of a magnetic or metallic sensor, it may be sufficient for the detecting end of the sensor to simply be located closely adjacent to the main passageway 220 in order to sense the plunger. In that case, the sensor hole in which the sensor is mounted may not extend all the way into the main passageway 220.

As is well known to those of skill in the art, the lubricator cap assembly 270 may house one or more mechanisms that facilitate handling the plunger. These mechanisms can include an anvil that the plunger hits when it arrives in the receiving location. The anvil can be mounted to a spring assembly that is designed to cushion any mechanical shock or jarring that can occur if the plunger travels rapidly up the main passageway 220 of the unitary body 200/300 and impacts the anvil.

There may also be a reset bar or rod that extends down from the lubricator cap assembly 270 into an upper portion of the main passageway 220. The lower end of reset bar or rod would be located at a position within the main passageway 220 that will be occupied by the plunger when it is seated at the receiving position. When such a reset bar or rod is provided, upward movement of the plunger will cause the reset bar or rod to extend down into an interior of the plunger. The upward movement of the plunger relative to the stationary reset bar or rod will cause the reset bar or rod to reset a valve mechanism within the plunger into an open condition. Opening that valve mechanism would allow fluid to pass through an internal passageway of the plunger, which allows the plunger to descend back into the wellbore. Key to successful operation of the plunger is that the plunger travel fully up into the receiving position in the lubricator so that the reset bar or rod will cause the valve mechanism in the plunger to reset to the open condition.

In existing designs, the anvil which the plunger contacts upon arrival, as well as the reset bar or rod (when provided) are slidably mounted to an interior bore of the lubricator cap assembly. In the embodiments illustrated in FIGS. 1A-2C, a replaceable insert 175 is provided in the lubricator cap assembly 170, and the anvil is mounted on the replaceable insert 175. In the embodiments illustrated in FIGS. 3A-4E, a similar replaceable insert 275 is provided in the lubricator cap assembly 270, and the anvil is mounted on the replaceable insert 275. The replaceable inserts 175/275 serve to reduce the wear experienced by the anvil and the interior bore of the lubricator cap assembly 170/270, and may also absorb some of the shock generated by contact between the plunger and anvil. Further, these inserts 175/275 could be replaced when worn, as opposed to replacing a worn anvil or a worn portion of the lubricator cap assembly 170/270.

In the embodiment illustrated in FIGS. 3A-3D, the unitary body 200 includes an upwardly extending neck 207 upon which the lubricator cap assembly 270 is mounted. In the embodiment illustrated in FIGS. 4A-4D, the unitary body 300 lacks an upwardly extending neck 207. Instead, a mounting neck 209 with a flange 278 is bolted to the top of the unitary body 300. The lubricator cap assembly 270 is then attached to the mounting neck 209.

The embodiment illustrated in FIGS. 4A-4D may make it easier to access and perform maintenance and repair on the mechanisms within the lubricator cap assembly 270 and/or to access the internal passageways at the upper end of the unitary body 300. Further, the modular design of the embodiment illustrated in FIGS. 4A-4D may make it easier to replace the lubricator head assembly without replacing the unitary body 300, or to replace the unitary body 300 without replacing the lubricator head assembly 270.

Figure 7:
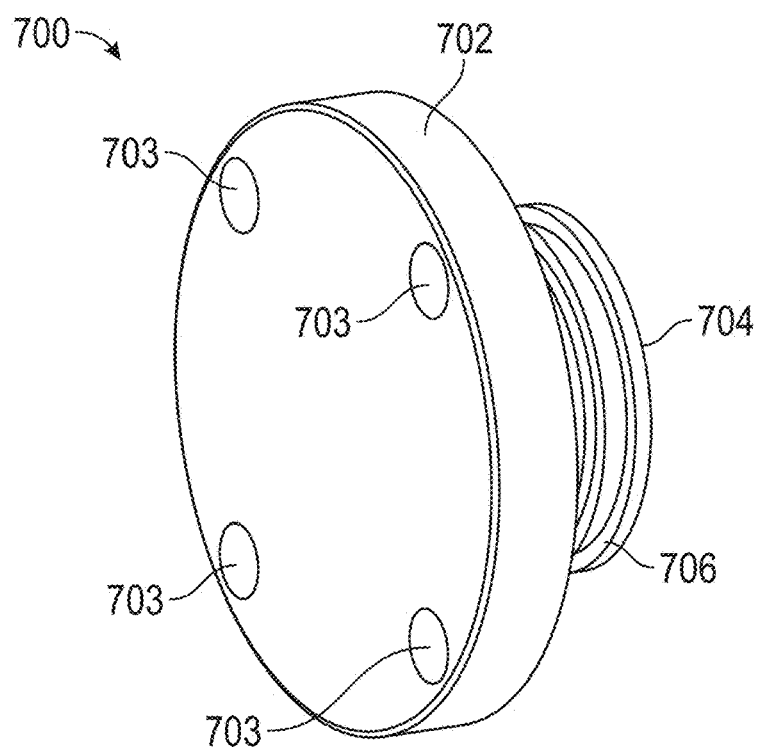
FIG. 7 is a perspective view of a blank plate that can be installed on an external aperture of a unitary wellhead flow block lubricator assembly as illustrated in FIGS. 3A-4B.

If a well is new and has good natural flow, there would be no need to employ a plunger. In this case, a blank plate 700 as illustrated in FIG. 7 can be mounted on the first opening on the lower portion of the front 201 of the unitary body 200/300 to cover the choke passageway 216. With no choke mechanism mounted, fluid is free to flow through the main passageway 220 and through one or more of the return passageways 242, 244 and 246, and then out through one or both of the first and second outflow passageways 212/214. Under these circumstances, it would not likely be desirable to install any flow restrictors to alter the flow though any of the internal passageways.

Figure 4E:
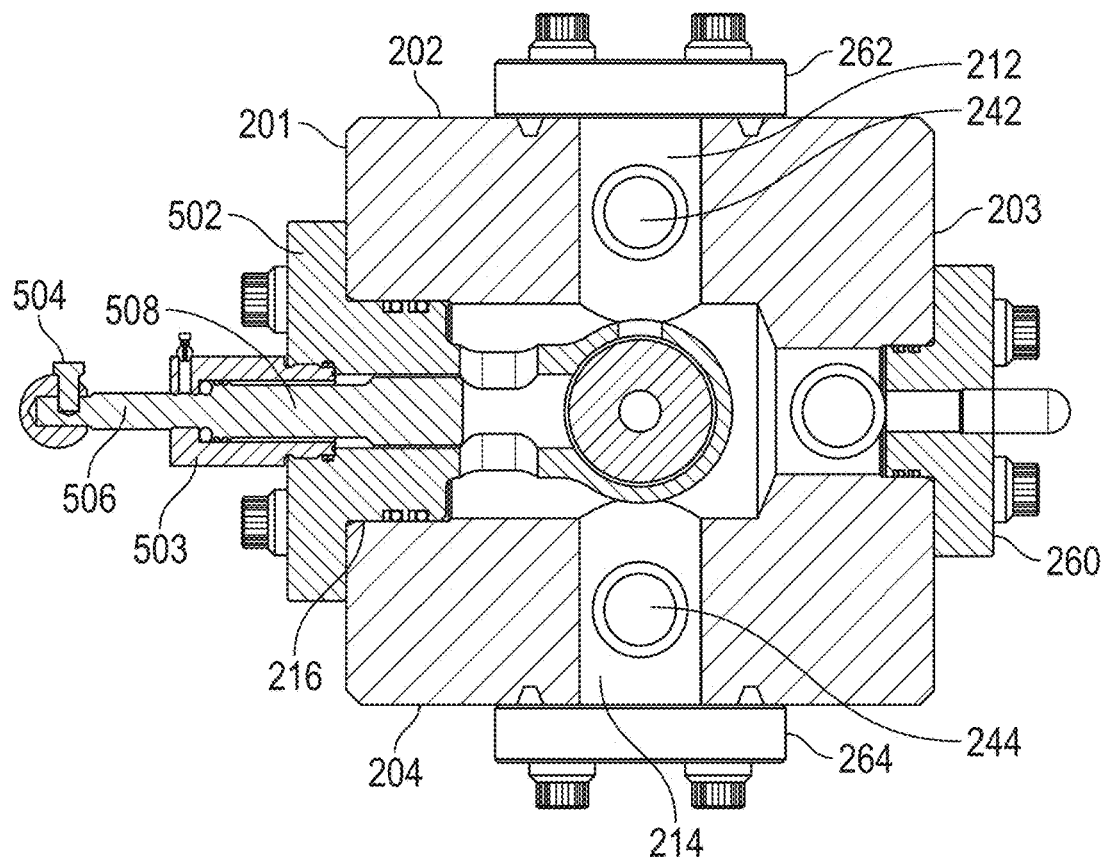
FIG. 4E and a cross-sectional view of a lower portion of a unitary wellhead flow block lubricator assembly as illustrated in FIGS. 3A, 3B or as illustrated in FIGS. 4A and 4B.

If a well no longer has good natural flow, and a plunger is being used, a choke mechanism 500 can be mounted in the choke passageway 216 of the unitary body 200/300, as illustrated in FIGS. 3C and 4C. The choke mechanism 500 can selectively reduce flow from the inlet passageway 222 into the first and second outflow passageways 212, 214 to thereby enhance flow of fluid up into the main passageway 220. Greater flow into the main passageway 220 helps to ensure the plunger travels into the receiving position in the main passageway 220. FIG. 4E illustrates a cross-sectional view taken through a lower portion of the unitary body 200/300 where the choke passageway 216, the first outflow passageway 212, the second outflow passageway 214 and the rear outflow passageway 218 are located. This view helps to illustrate how the integrated choke mechanism 500 can be used.

Figure 5A:
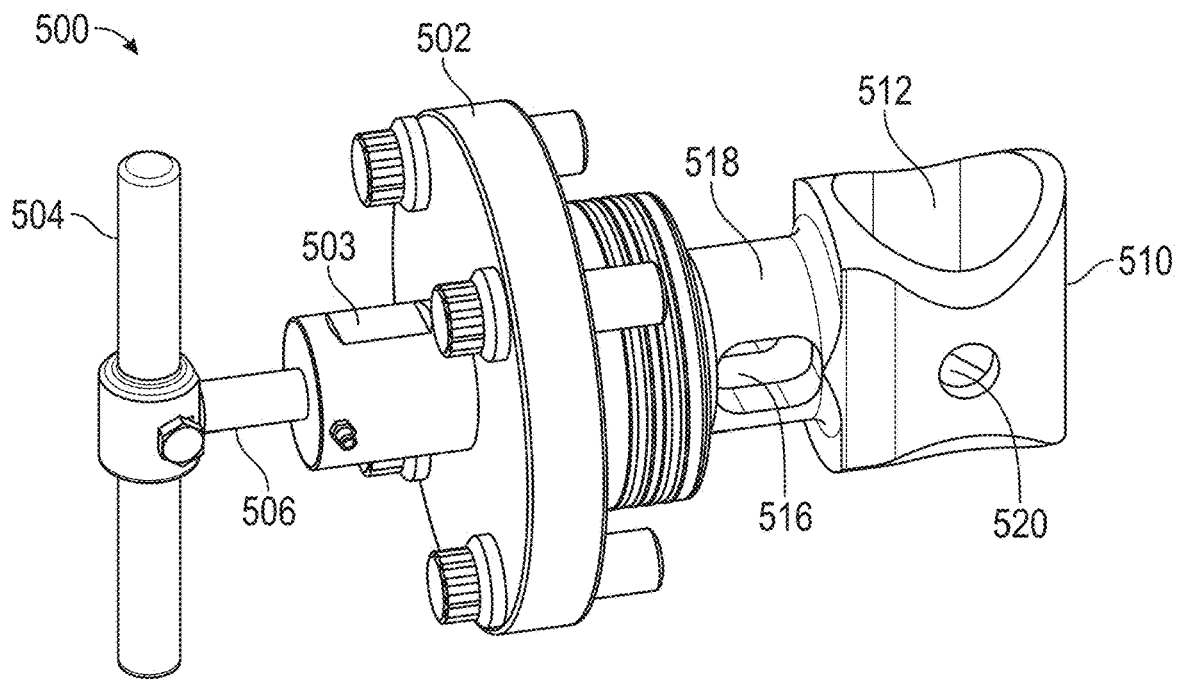
FIG. 5A is a perspective view of an integrated choke mechanism that can be installed in a unitary wellhead flow block lubricator assembly as illustrated in FIGS. 3A-4B.
Figure 5B:
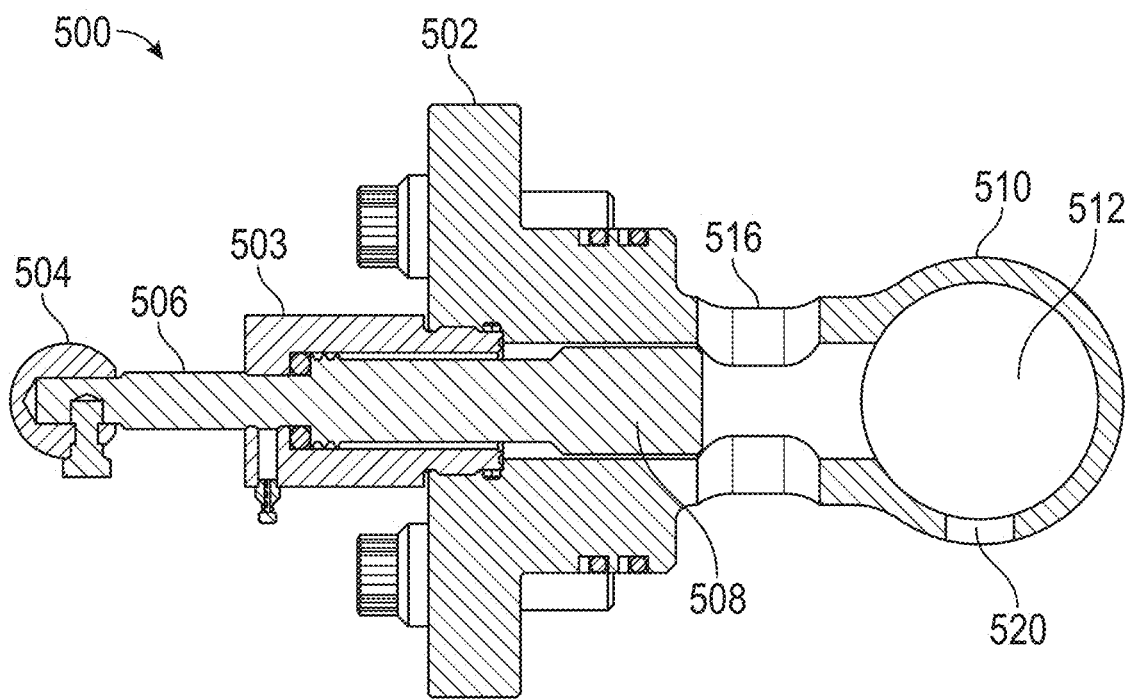
FIG. 5B is a cross-sectional view of the integrated choke mechanism illustrated in FIG. 5A.

The integrated choke mechanism 500 is illustrated in FIGS. 5A and 5B. The integrated choke mechanism 500 includes a flange 502 that can be bolted to the first opening on the lower portion of the front 201 of the unitary body 200/300. A flow control arm extends from the flange 502 into the interior of the unitary body 200/300. The flow control arm includes a cylindrical sleeve 510 with an interior bore 512. A pilot orifice 520 is located on one side of the cylindrical sleeve 510. When the flange 502 and control arm are mounted on the unitary body 200/300, the interior bore 512 of the cylindrical sleeve 510 is aligned with the inlet passageway 222 and the main passageway 220 of the unitary body 200/300. This allows a plunger to travel up through the inlet passageway 222, through the interior bore 512 of the cylindrical sleeve 510 and up into the main passageway 220.

Depending on how the choke mechanism 500 is mounted on the unitary body 200/300, the pilot orifice 520 can be aimed at the first outflow passageway 112 or the second outflow passageway 114. Typically, the pilot orifice 520 is pointed to the outflow passageway 112/114 connected to a production line. Regardless of which direction the pilot orifice 520 is pointed, the cylindrical sleeve 510 ensures that a considerable amount of the fluid exiting the inlet passageway 222 flows up into the main passageway 220.

FIGS. 5A and 5B also illustrate that the control arm of the choke mechanism 500 includes a reduced diameter portion 518 which is hollow and which includes side apertures 516 that lead into the hollow interior of the reduced diameter portion 518. As illustrated in FIG. 4E, the reduced diameter portion 518 and the apertures 516 ensure that any fluid flowing into the lower distribution block through either the inlet passageway 222 or the first, second and third return passageways 242, 244 and 246 can flow into the first and second outlet passageways 212, 214.

Fluid from the well that is traveling through the inlet passageway 222 flows into the cylindrical sleeve 510, and then into the hollow interior of the reduced diameter portion 518. The fluid can then escape the hollow interior of the reduced diameter portion through the apertures 516, at which point the fluid can travel out via one or both of the first and second outflow passageways 512, 514.

The choke mechanism 500 also includes a rotatably mounted flow restrictor 506 that is attached to a handle 504. The flow restrictor 506 has external threads that engage with internal threads of a mounting stem 503. Rotating the flow restrictor 506 in one direction will cause a tip 508 of the flow restrictor to protrude into the hollow interior of the reduced diameter portion 518, which blocks flow of fluid out of the apertures 516 on the reduced diameter portion 518. Thus, turning the handle 504 of the choke mechanism allows one to selectively vary the amount of fluid that can flow from the inlet passageway 222 to the outlet passageways 212/214 via the hollow interior of the reduced diameter portion 518. This, in turn, selectively varies the amount of fluid flowing from the inlet passageway 222 up into the main passageway 220.

An integrated choke mechanism as depicted in FIGS. 5A and 5B can be used on the embodiments of a flow block and lubricator assembly illustrated in FIGS. 1A-2C as well as on the embodiments of a unitary flow block lubricator assembly depicted in FIGS. 3A-4E.

Figure 6A:
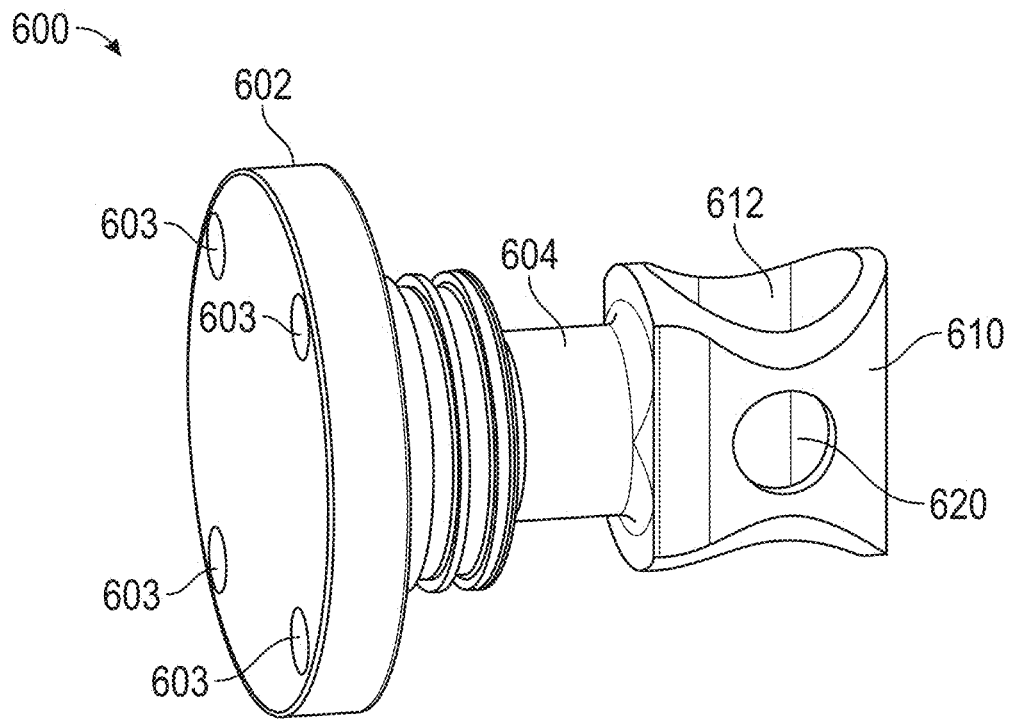
FIG. 6A is a perspective view of a lower outlet flow restrictor that can be installed in a unitary wellhead flow block lubricator assembly as illustrated in FIGS. 3A-4B.
Figure 6B:
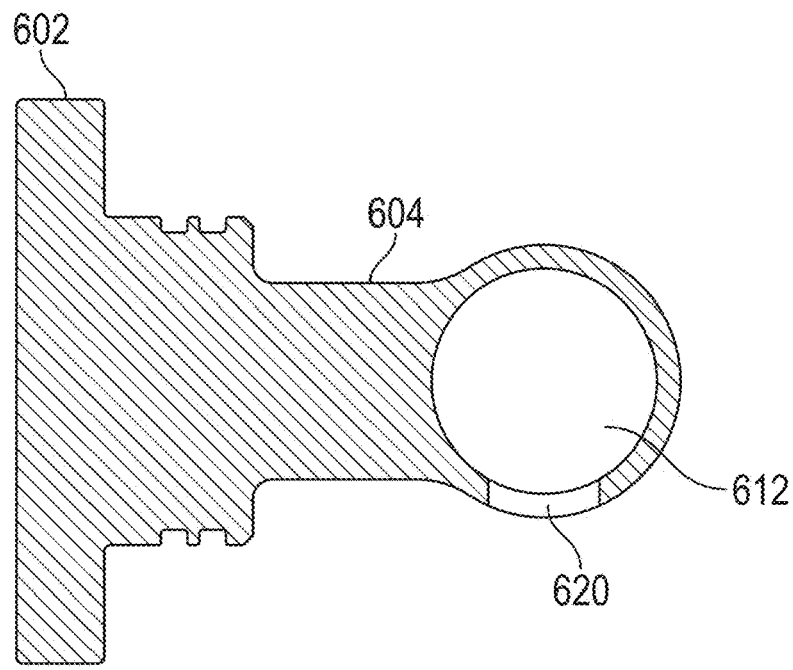
FIG. 6B is a cross-sectional view of the lower outlet flow restrictor illustrated in FIG. 6A.

FIGS. 6A and 6B illustrate a lower flow outlet assembly 600 that could be used in place of the integrated choke mechanism 500 described above. The lower flow outlet assembly 600 could also be mounted on the embodiments of a flow block and lubricator assembly illustrated in FIGS. 1A-2C as well as on the embodiments of a unitary flow block lubricator assembly depicted in FIGS. 3A-4E.

The lower flow outlet assembly 600 includes features similar to the choke mechanism 500 depicted in FIGS. 5A and 5B, but lacks a movable flow restrictor 506. The lower flow outlet assembly 600 still includes a flange 602 with bolt holes 603 that allow the flow controller 600 to be mounted in two different rotational orientations. The flow controller 600 also includes a cylindrical sleeve 610 with a central bore 612, as well as a pilot orifice 620. The lower flow outlet assembly 600 also includes a reduced diameter portion 604, but that reduced diameter portion 604 is not hollow. The design of the lower flow outlet assembly 600 allows fluid entering the lower distribution block from the inlet passageway 222 or the first, second and third return passageways 242, 244 and 246 to flow out the first and second outflow passageways 212, 214. However, the lower flow outlet assembly ensures that the majority of the flow in the inlet passageway is routed up into the main passageway 220, thereby helping to ensure a plunger will be carried fully up into the receiving position in the main passageway 220.

While the choke mechanism 500 or lower flow outlet assembly 600 can be used to selectively control the flow of fluid into and out of the lower distribution block, various other flow restricting devices can be used to control the flow of fluid through other passageways of the unitary body 200/300. Examples of some flow control devices are shown in FIGS. 7, 9A-9C and 10. These flow control devices are configured to be bolted or mounted to the unitary body 200/300 so that they cover an opening on an external surface of the unitary body 200/300 that leads to one of the internal passageways.

If one does not wish to impose any flow restrictions on an internal passageway of the unitary body 200/300, a blank plate 700 as illustrated in FIG. 7 could be mounted to an opening on the external surface of the unitary body that leads to the internal passageway. The blank plate 700 includes a flange 702 with bolt holes 703. A small cylindrical protrusion 704 extends away from the internal side of the flange 702 and that would extend into a hole in the unitary body 200/300 to which the blank plate 700 is mounted. The cylindrical protrusion 704 may include one or more seal elements 706 that would seal against the interior bore of the hole in the unitary body 200/300 to which the blank plate 700 is mounted.

Figure 8:
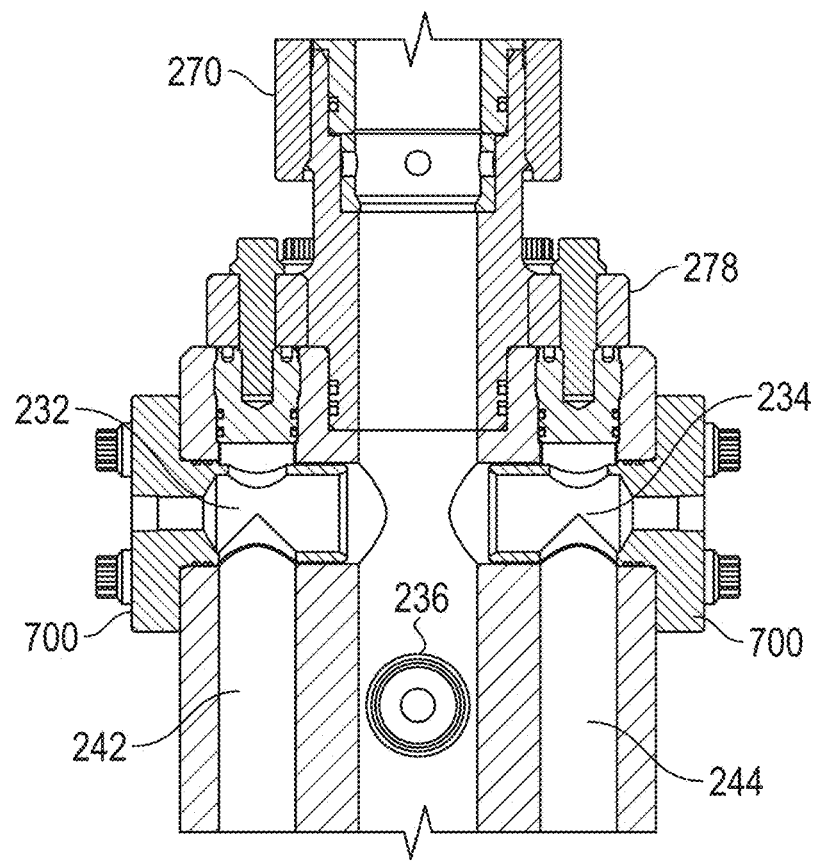
FIG. 8 is a cross-sectional view of an upper portion of a unitary wellhead flow block lubricator assembly as illustrated in FIGS. 4A and 4B illustrating an upper distribution block.

FIG. 8 shows an example of how blank plates 700 as depicted in FIG. 7 could be mounted to the first upper opening that leads to the first upper passageway 232 and to the second upper opening that leads to the second upper passageway 234 of the upper portion of the unitary body 200/300. This would seal the first and second upper openings, but leave the first and second upper passageways 232, 234 unrestricted. As a result, fluid would be free to flow from the upper distribution block, through the first and second upper passageways 232, 234 and down into the first and second return passageways 242, 244.

Similarly, a blank plate 700 could be mounted to the first manifold 142 depicted in FIGS. 1A and 1B and/or to the second manifold as depicted in FIGS. 2A and 2B. This would allow fluid in these embodiments to flow freely from the main passageway 122, through the upper passageways and then through the return passageways 140, 148.

Figure 9A:
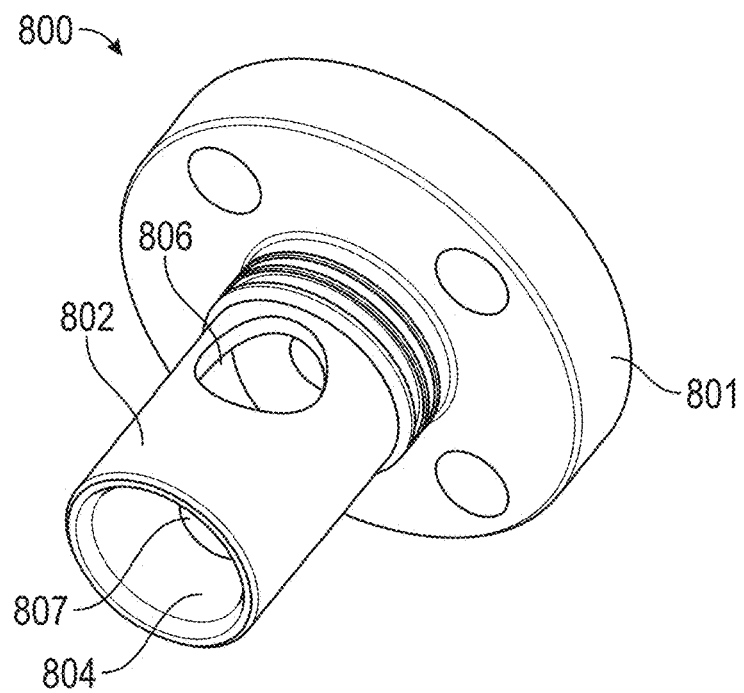
FIG. 9A is a perspective view of a first embodiment of a flow restrictor than can be mounted to an exterior of a flow block and lubricator assembly as illustrated in FIGS. 1A-2C or a unitary wellhead flow block lubricator assembly as illustrated in FIGS. 3A-4B.
Figure 9B:
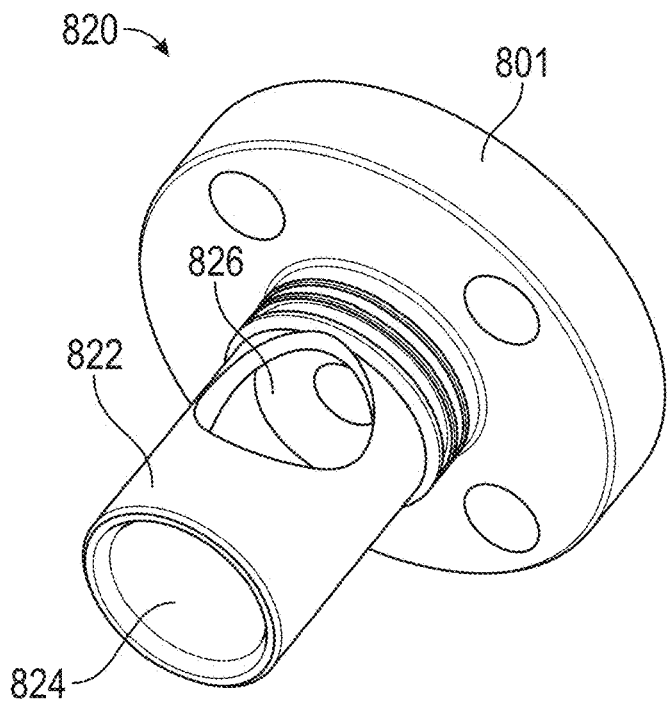
FIG. 9B is a perspective view of a second embodiment of a flow restrictor than can be mounted to an exterior of a flow block and lubricator assembly as illustrated in FIGS. 1A-2C or a unitary wellhead flow block lubricator assembly as illustrated in FIGS. 3A-4B.
Figure 9C:
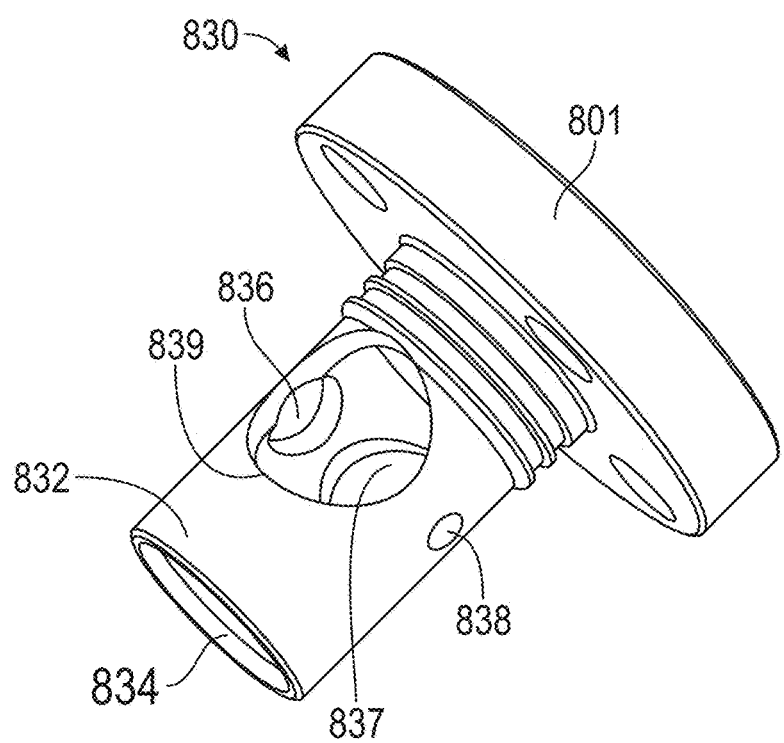
FIG. 9C is a perspective view of a third embodiment of a flow restrictor that can be mounted to an exterior of a flow block and lubricator assembly as illustrated in FIGS. 1A-2C or a unitary wellhead flow block lubricator assembly as illustrated in FIGS. 3A-4B.

If one wishes to restrict the flow of fluid in the first return passageway 242 of the embodiments illustrated in FIGS. 3A-4E, one could mount one of the flow restrictors illustrated in FIGS. 9A-9C in the first upper opening on the first side 202 of the unitary body 200/300. Likewise, to restrict the flow of fluid in the second return passageway 244, one could mount one of the flow restrictors illustrated in FIGS. 9A-9C in the second upper opening on the second side 204 of the unitary body 200/300. To restrict the flow of fluid in the third return passageway 246, one could mount one of the flow restrictors illustrated in FIGS. 9A-9C in the third upper opening on the rear side 203 of the unitary body 200/300.

In the case of the embodiments illustrated in FIGS. 1A-2C, one could restrict the flow of fluid through the first return passageway 140 by mounting one of the flow restrictors illustrated in FIGS. 9A-9C in the first return manifold 142. In the embodiment illustrated in FIGS. 2A-2C, one could restrict the flow of fluid through the second return passageway 148 by mounting one of the flow restrictors illustrated in FIGS. 9A-9C in the second return manifold 146.

A first flow restrictor 800 as depicted in FIG. 9A has a flange 801 and a hollow cylindrical pipe 802 with a first flow aperture 806 having a first diameter formed in the cylindrical pipe 802. A second flow aperture 807 is also formed in the cylindrical pipe 802 at a position 180° opposite the first flow aperture 806. The second flow aperture 807 has a smaller diameter than the first flow aperture 806. The end 804 of the cylindrical pipe is open.

When a flow restrictor 800 as depicted in FIG. 9A is mounted in the first upper opening of the unitary body 200/300, the cylindrical pipe 802 will extend down into the first upper passageway 232. If the flow restrictor 800 is mounted in a first rotational orientation such that the first flow aperture 806 is aligned with the first return passageway 242, fluid can flow from the upper distribution block, through the first flow aperture 806, and down into the first return passageway 242. However, the diameter of the first flow aperture 806 will impose a first flow restriction on the flow of fluid from the upper distribution block down into the first return passageway 242. This would generate a first level of backpressure in the main passageway, and that backpressure may help to ensure that a plunger arriving in the main passageway 220 travels fully up into the receiving location in the main passageway 220.

If the flow restrictor 800 is instead mounted in a second rotational orientation such that the second flow aperture 807 is aligned with the top of the first return passageway 242, the second smaller diameter aperture 807 will impose a greater flow restriction on fluid flowing from the upper distribution block down into the first return passageway 242 than the first flow aperture 806. This would create a greater level of backpressure in the main passageway of the unitary body 200/300. The greater backpressure would provide even more force on the plunger to ensure the plunger travels fully up in the main passageway to the receiving location in the main passageway 220.

FIG. 9B illustrates a second embodiment of a flow restrictor 820 that is similar to the one illustrated in FIG. 9A. In this second embodiment, a single flow aperture 826 in the cylindrical pipe 822 has a larger diameter than the first flow aperture 806 or the second flow aperture 807 in the first embodiment illustrated in FIG. 9A. Also, there is no second flow aperture opposite the large diameter flow aperture 826. An operator could replace a first flow restrictor 800 as depicted in FIG. 9A with a second flow restrictor 820 as depicted in FIG. 9B to reduce the restriction on flow of fluid into the first return passageway 242, or to block all flow into the first return passageway 242.

If the second flow restrictor 820 is mounted in the first upper opening of the unitary body 200/300 such that the large diameter flow aperture 826 is aligned with the upper end of the first return passageway 242, the flow from the upper distribution block, through the large diameter flow aperture 826, and down into the first return passageway 242 would be even less restricted than when the first flow restrictor 800 depicted in FIG. 9A was mounted. This would decrease the backpressure in the main passageway 220, which could increase the flow rate out of the well.

Alternatively, if the second flow restrictor 820 is mounted in the first upper opening of the unitary body 200/300 in a rotational orientation in which the closed wall portion of the cylindrical wall 822 opposite the large diameter flow aperture 826 is aligned with the upper end of the first return passageway 242, flow from the upper distribution block and down into the first return passageway 242 would be blocked. This would serve to increase the backpressure in the main passageway 220 even more than when the first flow restrictor 800 depicted in FIG. 9A was mounted. This may be desirable to ensure that the plunger travels fully up into the receiving location in the main passageway 220.

FIG. 9C illustrates a third embodiment of a flow restrictor 830 that includes four different sized flow apertures 836, 837, 838 and 839 on the cylindrical pipe 832. An operator can install the third flow restrictor 830 in any of four different rotational orientations to align a selected one of the flow apertures 836, 837, 838 and 839 with the first return passageway 242 to selectively vary a flow rate of fluid from the upper distribution block down into the first return passageway 242. This allows an operator to selectively vary the flow of fluid to the passageways to optimize the operational condition of the well.

Flow restrictors as depicted in FIGS. 7 and 9A-9C make it possible to easily and quickly vary a fluid flow rate through one or more of the internal passageways of the unitary body 200/300 in the embodiments illustrated in FIGS. 3A-4E. The flow restrictors can also enable an operator to selectively vary a flow rate through the main passageway 122 and the first and second return passageways 140, 148 of the embodiments illustrated in FIGS. 1A-2C. This makes is easy and quick for operators to adapt the wellhead flow block lubricator assemblies to changing operational conditions.

Figure 10:
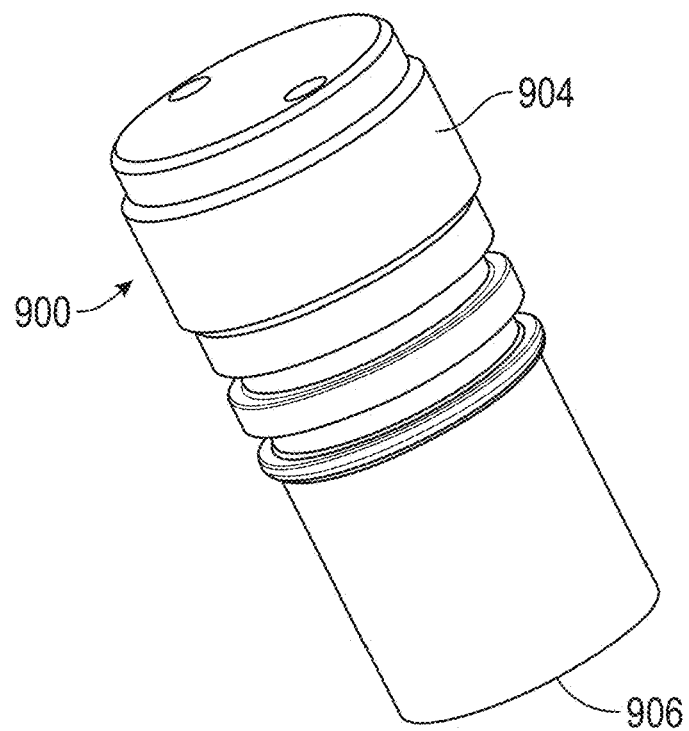
FIG. 10 is a perspective view of a choke plug that could be installed on an exterior of a flow block and lubricator assembly as illustrated in FIGS. 1A-2C or a unitary wellhead flow block lubricator assembly as illustrated in FIGS. 3A-4B.
Figure 11:
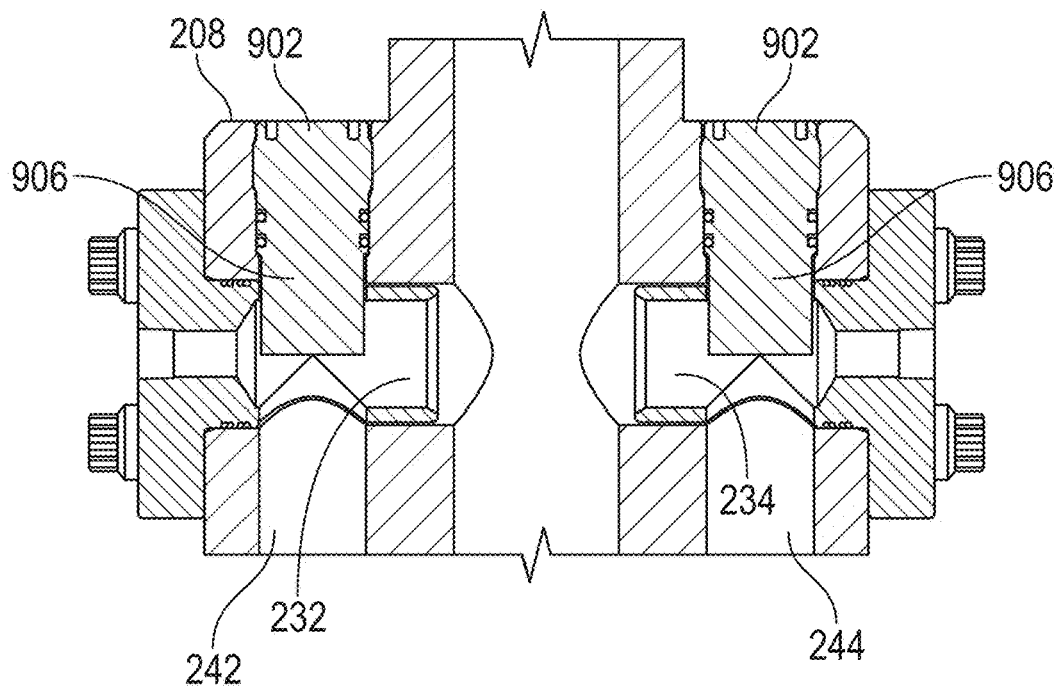
FIG. 11 is a cross-sectional view of an upper portion of a unitary wellhead flow block lubricator assembly as illustrated in FIGS. 3A and 3B showing choke plugs as illustrated FIG. 10 installed in the top of the unitary body.

FIGS. 10 and 11 illustrate another alternate way of controlling the flow rate of fluid through one or more of the internal passageways of the unitary body 200/300. This way of controlling flow through the passageways makes use of plugs which are mounted in holes that are formed in the top of the unitary body 200/300 of the embodiments depicted in FIGS. 3A-4E.

As shown in FIGS. 3C, 3D, 4C and 4D, in order to form the first, second and third return passageways 242, 244, 246, it is necessary to drill down into the top 208 of the block of material that forms the unitary body 200/300. The upper portions of those holes in the top 208 of the unitary body 200/300 are then sealed with plugs. In the first embodiment illustrated in FIGS. 3C and 3D, the plugs 274 have a flat, featureless top surface. In the second embodiment illustrated in FIGS. 4C and 4D, the top of the plugs 276 are tapped with internal threads. The flange 278 of the mounting neck 209 can then be attached to the top 208 of the unitary body 300 by bolts that extend down through the flange 278 and engage the internal threads in the plugs 276. Because of where the plugs 274/276 are located, it would be possible for the plugs to extend downward enough to block flow through the first and second upper passageways 232, 234 in the unitary body 200/300.

FIG. 10 depicts a flow restrictor plug 900 that could be mounted in one of the apertures in the top 208 of the unitary body 200/300 that were created when the holes for the first and second return passageways 242, 244 were formed. The flow restrictor plug 900 includes a head 904 that would be mounted in an aperture in the top 208 of the unitary body 200/300 A bottom 906 of the flow restrictor plug 900 would then extend down into a passageway to partially or fully block the flow of fluid through the passageway.

FIG. 11 shows how flow restrictor plugs 900 could be mounted in the apertures in the top 208 of the unitary body 200/300 that lead into the first and second upper flow passageways 232, 234. The bottom portions 906 of the flow restrictor plugs 900 extend down into the first and second upper flow passageways 232, 234 to partially block the flow of fluid through the first and second upper passageways 232, 234, thereby restricting the flow of fluid from the upper distribution block down into the first and second return passageways 242, 244. The length of the flow restrictor plugs 900 can be varied to selectively vary how much of the first and second upper passageways 232, 234 are blocked, and thus how much flow into the first and second return passageways is reduced.

The unitary wellhead flow block lubricator assembly described above provides for multifunctional use. When a well has good natural flow without the need for a plunger, a blank plate 700 as illustrated in FIG. 7 can be mounted over the choke passageway 216 and the unitary wellhead flow block lubricator assembly can be used as a traditional flow block. In this configuration, it may not be necessary to provide any of the plunger handling mechanisms in the lubricator cap assembly 270 or a plunger catcher mechanism 230.

When well production declines and it becomes advantageous to begin using a plunger, the blank plate 700 can be replaced with a choke mechanism 500 or a lower flow outlet assembly 600. Also, if not already present, the plunger handling mechanisms can be added to the lubricator cap assembly 270 and the plunger catcher 230 can be added to the lubricator assembly. The unitary wellhead flow block lubricator assembly can then be used in connection with plunger assist operations to optimize production.

When the unitary wellhead flow block lubricator assembly is used in connection with a plunger, a blank plate 700 and the various flow restrictors 800, 820, 830 illustrated in FIGS. 9A-9C can be used to control the flow of fluids and gas though the internal passageways, and in particular the return passageways 242, 244, 246, to thereby control the movement and speed of movement of the plunger as it arrives in the unitary body 200/300. The blank plate 700 and the flow restrictors 800, 820, 830 can be easily removed for inspection and repair of both themselves and the passageways, and to remount one of the flow restrictors 800, 820, 830 to alter the flow through one or more passageways of the unitary body 200/300.

The foregoing descriptions explained how one or more choke mechanisms can be mounted on various parts of a unitary wellhead flow block lubricator. Some of the choke mechanisms can be selectively adjusted to allow greater or lesser amounts of fluid and/or gas to flow through a passageway. In the embodiments illustrated in the drawings, the choke mechanisms are manually adjustable. However, alternate embodiments could be selectively adjusted via an electric motor, via pneumatic or hydraulic means or via other control mechanisms. Thus, any references to a choke mechanism should be interpreted to include manually adjustable choke mechanisms, as well as choke mechanisms that incorporate electrical, pneumatic and/or hydraulic control systems.

Conditional language, such as, "can," "could," "might," or "may," unless specifically stated otherwise, or otherwise understood within the context as used, is generally intended to convey that certain implementations could, but do not necessarily, include certain features and/or elements while other implementations may not. Thus, such conditional language generally is not intended to imply that features and/or elements are in any way required for one or more implementations or that one or more implementations necessarily include these features and/or elements. It is also intended that, unless expressly stated, the features and/or elements presented in certain implementations may be used in combination with other features and/or elements disclosed herein.

The specification and annexed drawings disclose example embodiments of the present disclosure. Detail features shown in the drawings may be enlarged herein to more clearly depict the feature. Thus, several of the drawings are not precisely to scale. Additionally, the examples illustrate various features of the disclosure, but those of ordinary skill in the art will recognize that many further combinations and permutations of the disclosed features are possible. Accordingly, various modifications may be made to the disclosure without departing from the scope or spirit thereof. Further, other embodiments may be apparent from the specification and annexed drawings, and practice of disclosed embodiments as presented herein. Examples disclosed in the specification and the annexed drawings should be considered, in all respects, as illustrative and not limiting. Although specific terms are employed herein, they are used in a generic and descriptive sense only, and not intended to the limit the present disclosure.

What is claimed is:

1. A choke mechanism for a wellhead flow block, comprising:
   a flow control arm configured to be mounted, at least in part, within a lower distribution block or a flow passageway of a wellhead flow block, the flow control arm including:
   a hollow cylindrical sleeve that is configured to be positioned in the lower distribution block or the flow passageway of the wellhead flow block such that fluid traveling through the flow passageway can pass through an interior of the hollow cylindrical sleeve; and
   a hollow reduced diameter portion having a hollow interior bore and having a first end that is coupled to the hollow cylindrical sleeve such that an interior of the hollow reduced diameter portion is in communication with the interior of the hollow cylindrical sleeve, wherein a central longitudinal axis of the hollow cylindrical sleeve is oriented substantially at right angles to a central longitudinal axis of the hollow interior bore of the reduced diameter portion;
   a flange assembly coupled to a second end of the hollow reduced diameter portion and configured to secure the flow control arm to a wellhead flow block such that the hollow cylindrical sleeve is positioned within the lower distribution block or the flow passageway of the wellhead flow block; and
   a flow restrictor that is movably mounted on the flange assembly, the flow restrictor being moveable between a retracted position at which a tip of the flow restrictor is substantially retracted from the interior of the hollow reduced diameter portion and an extended position at which the tip of the flow restrictor extends into and at least partially occludes the interior of the hollow reduced diameter portion.

2. The choke mechanism of claim 1, wherein at least one aperture is provided through a wall of the hollow reduced diameter portion such that fluid located in the interior of the hollow cylindrical sleeve can travel into the interior of the hollow reduced diameter portion and then pass through the at least one aperture to a location outside the hollow reduced diameter portion.

3. The choke mechanism of claim 2, wherein when the flow restrictor is located in the extended position, the tip of the flow restrictor at least partially prevents fluid in the interior of the hollow reduced diameter portion from escaping out the at least one aperture to a location outside the hollow reduced diameter portion.

4. The choke mechanism of claim 1, wherein the flow restrictor is movably mounted within a restrictor passageway of the flange assembly.

5. The choke mechanism of claim 4, wherein internal threads are provided on an inner surface of the restrictor passageway, wherein external threads are formed on an exterior of the flow restrictor, the external threads on the flow restrictor mating with the internal threads on the restrictor passageway such that rotating the flow restrictor in the restrictor passageway causes the flow restrictor to move between the retracted and extended positions.

6. The choke mechanism of claim 5, wherein the flange assembly further comprises a hollow mounting stem that protrudes from an exterior of the flange assembly, and wherein the internal threads are formed on an inner surface of the hollow mounting stem.

7. The choke mechanism of claim 1, wherein a proximal end of the flow restrictor that is opposite the tip protrudes from an exterior of the flange assembly, and wherein the proximal end of the flow restrictor can be manipulated to cause the flow restrictor to move between the retracted and extended positions.

8. The choke mechanism of claim 1, wherein an outer diameter of the hollow cylindrical sleeve is greater than an outer diameter of the hollow reduced diameter portion.

9. The choke mechanism of claim 1, wherein the hollow cylindrical sleeve, the hollow reduced diameter portion and at least a portion of the flange assembly comprise a single unitary piece.

10. A wellhead flow block lubricator assembly, comprising:
a body configured to be attached to an outflow pipe or a master valve of a wellhead;
a lower distribution block located within a lower portion of the body, the lower distribution block communicating with first and second lower openings provided, respectively, on a front and a first side of a lower portion of the body;
a flow passageway extending through the body from a bottom of the body through the lower distribution block and on to an upper portion of the body; and
a choke mechanism mounted over the first lower opening on the front of the body, the choke mechanism comprising:
a flow control arm including:
a hollow cylindrical sleeve that is positioned within the lower distribution block or the flow passageway such that fluid traveling through the flow passageway can pass through an interior of the hollow cylindrical sleeve; and
a hollow reduced diameter portion having a hollow interior bore and having a first end that is coupled to the hollow cylindrical sleeve such that an interior of the hollow reduced diameter portion is in communication with the interior of the hollow cylindrical sleeve, wherein a central longitudinal axis of the hollow cylindrical sleeve is oriented substantially at right angles to a central longitudinal axis of the hollow interior bore of the reduced diameter portion;
a flange assembly coupled to a second end of the hollow reduced diameter portion and configured to secure the choke mechanism to the front of the body; and
a flow restrictor that is movably mounted on the flange assembly, the flow restrictor being moveable between a retracted position at which a tip of the flow restrictor is substantially retracted from the interior of the hollow reduced diameter portion and an extended position at which the tip of the flow restrictor extends into and at least partially occludes the interior of the hollow reduced diameter portion.

11. The wellhead flow block lubricator assembly of claim 10, wherein a central longitudinal axis of the hollow cylindrical sleeve is aligned with a central longitudinal axis of the flow passageway.

12. The wellhead flow block lubricator assembly of claim 10, wherein at least one aperture is provided through a wall of the hollow reduced diameter portion such that fluid located in the interior of the hollow cylindrical sleeve can travel into the interior of the hollow reduced diameter portion and then pass through the at least one aperture to a location outside the hollow reduced diameter portion.

13. The wellhead flow block lubricator assembly of claim 12, wherein when the flow restrictor is located in the extended position, the tip of the flow restrictor at least partially prevents fluid in the interior of the hollow reduced diameter portion from escaping out the at least one aperture to a location outside the hollow reduced diameter portion.

14. The wellhead flow block lubricator assembly of claim 10, wherein the flow restrictor is movably mounted within a restrictor passageway of the flange assembly.

15. The wellhead flow block lubricator assembly of claim 14, wherein internal threads are provided on an inner surface of the restrictor passageway, wherein external threads are formed on an exterior of the flow restrictor, the external threads on the flow restrictor mating with the internal threads on the restrictor passageway such that rotating the flow restrictor in the restrictor passageway causes the flow restrictor to move between the retracted and extended positions.

16. The wellhead flow block lubricator assembly of claim 15, wherein the flange assembly further comprises a hollow mounting stem that protrudes from an exterior of the flange assembly, and wherein the internal threads are formed on an inner surface of the hollow mounting stem.

17. The wellhead flow block lubricator assembly of claim 10, wherein a proximal end of the flow restrictor that is opposite the tip protrudes from an exterior of the flange assembly, and wherein the proximal end of the flow restrictor can be manipulated to cause the flow restrictor to move between the retracted and extended positions.

18. The wellhead flow block lubricator assembly of claim 10, wherein an outer diameter of the hollow cylindrical sleeve is greater than an outer diameter of the hollow reduced diameter portion.

19. The wellhead flow block lubricator assembly of claim 10, wherein the hollow cylindrical sleeve, the hollow reduced diameter portion and at least a portion of the flange assembly comprise a single unitary piece.

20. A choke mechanism for a wellhead flow block, comprising:
a flow control arm configured to be mounted, at least in part, within a lower distribution block or a flow passageway of a wellhead flow block, the flow control arm including:
a hollow cylindrical sleeve that is configured to be positioned in the lower distribution block or the flow passageway of the wellhead flow block such that fluid traveling through the flow passageway can pass through an interior of the hollow cylindrical sleeve; and
a hollow reduced diameter portion having a first end that is coupled to the hollow cylindrical sleeve such that an interior of the hollow reduced diameter portion is in communication the interior of the hollow cylindrical sleeve;
a flange assembly coupled to a second end of the hollow reduced diameter portion and configured to secure the flow control arm to a wellhead flow block such that the hollow cylindrical sleeve is positioned within the lower distribution block or the flow passageway of the wellhead flow block, wherein the hollow cylindrical sleeve, the hollow reduced diameter portion and at least a portion of the flange assembly comprise a single unitary piece; and a flow restrictor that is movably mounted on the flange assembly, the flow restrictor being moveable between a retracted position at which a tip of the flow restrictor is substantially retracted from the interior of the hollow reduced diameter portion and an extended position at which the tip of the flow restrictor extends into and at least partially occludes the interior of the hollow reduced diameter portion.

21. A wellhead flow block lubricator assembly, comprising:

a body configured to be attached to an outflow pipe or a master valve of a wellhead;

a lower distribution block located within a lower portion of the body, the lower distribution block communicating with first and second lower openings provided, respectively, on a front and a first side of a lower portion of the body;

a flow passageway extending through the body from a bottom of the body through the lower distribution block and on to an upper portion of the body; and a choke mechanism mounted over the first lower opening on the front of the body, the choke mechanism comprising:

a flow control arm including:
 a hollow cylindrical sleeve that is positioned within the lower distribution block or the flow passageway such that fluid traveling through the flow passageway can pass through an interior of the hollow cylindrical sleeve; and
 a hollow reduced diameter portion having a first end that is coupled to the hollow cylindrical sleeve such that an interior of the hollow reduced diameter portion is in communication with the interior of the hollow cylindrical sleeve;

a flange assembly coupled to a second end of the hollow reduced diameter portion and configured to secure the choke mechanism to the front of the body, wherein the hollow cylindrical sleeve, the hollow reduced diameter portion and at least a portion of the flange assembly comprise a single unitary piece; and a flow restrictor that is movably mounted on the flange assembly, the flow restrictor being moveable between a retracted position at which a tip of the flow restrictor is substantially retracted from the interior of the hollow reduced diameter portion and an extended position at which the tip of the flow restrictor extends into and at least partially occludes the interior of the hollow reduced diameter portion.

* * * * *